Feb. 12, 1952   J. B. GODSHALK ET AL   2,585,005
METHOD AND APPARATUS FOR CHARGING BATTERIES
Filed Oct. 26, 1949   7 Sheets-Sheet 1

INVENTORS
JAMES B. GODSHALK
LEWIS A. MEDLAR
BY
Stone, Boyden & Mack
Attys.

INVENTORS
JAMES B. GODSHALK
LEWIS A. MEDLAR
BY
Stone, Boyden & Mack
Attys.

INVENTORS
JAMES B. GODSHALK
LEWIS A. MEDLAR
BY
Stone, Boyden & Mack
Attys.

Feb. 12, 1952 J. B. GODSHALK ET AL 2,585,005
METHOD AND APPARATUS FOR CHARGING BATTERIES
Filed Oct. 26, 1949 7 Sheets-Sheet 5

INVENTORS
JAMES B. GODSHALK
LEWIS A. MEDLAR
BY
Stone, Boyden & Mack
Attys.

INVENTORS
JAMES B. GODSHALK
LEWIS A. MEDLAR
BY Stone, Boyden & Mack
Attys.

Patented Feb. 12, 1952

2,585,005

UNITED STATES PATENT OFFICE 2,585,005

METHOD AND APPARATUS FOR CHARGING BATTERIES

James B. Godshalk, Philadelphia, and Lewis A. Medlar, Oreland, Pa., assignors, by mesne assignments, to Sterlingworth Company, Philadelphia, Pa., a corporation of Delaware Application October 26, 1949, Serial No. 123,722

46 Claims. (Cl. 320—35)

This invention relates to battery charging, and particularly to a novel method and apparatus for charging storage batteries whereby duration of charging is determined by the rise in internal temperature of the battery during charging over its initial value at the start of charging.

In the prior art, battery charging methods have been of two general types: (1) wherein the duration of charging is determined by a manually adjusted time switch, and (2) wherein the duration of charging is determined automatically by attainment of a predetermined fixed maximum internal temperature, usually 125° F., in the battery being charged. The first method is illustrated by such patents as 2,354,877 to Peters and 2,347,452 to Amsden. The second method is taught in Patent 2,296,924 to Heyer. Neither the time switch method of charging nor the maximum temperature cutoff method of charging has proved entirely satisfactory in commercial practice because of certain inherent disadvantages.

The primary disadvantage of the time switch method of charging lies in its dependence upon the human element. According to the time switch method, a period of time is determined by the operator which will allow the particular charger employed to charge the battery to roughly the desired state of charge, and this period of time is "set into" the time switch by manual adjustment. The period of time required for a battery charger to raise the state of charge of a battery to a desired level depends upon a number of variables: (1) the charging current employed; (2) the temperature of the battery at the start of charging; (3) the initial state of charge of the battery, and (4) the size of the battery. These factors must be determined by the operator by observations and test, and the operator must then make manual adjustments in accordance with the results of his observations and tests. Thus, the human element is involved not only in determination of the factors upon which this method of charging depends but also in the necessary adjustments of the charging apparatus. If commercial battery charging were a laboratory operation, carried out by skilled technicians, dependence upon the human element would not be of great importance. But in commercial practice, battery chargers are usually operated by garagemen, service station operators, parking lot attendants, and others, all usually unskilled in the operation of electrical apparatus. Because of this operational errors are frequent when the time switch method of charging is employed, with the result that batteries are too often overcharged, damaged by overheating, or undercharged.

By eliminating manual adjustments, the maximum temperature cutoff method of charging has overcome the major disadvantage of the time switch method, but in doing so has introduced new disadvantages. This method is based upon the theory that the temperature of the electrolyte of the battery being charged varies substantially as the progress of the charge, that the relation between the progress of the charge and the temperature of the electrolyte is constant throughout the time period of the charge, and that such relation is independent of the wattage of charging. According to the maximum temperature cutoff method of charging, the charging apparatus is equipped with a device responsive to the electrolyte temperature of the battery being charged and operable to break the charging circuit when the electrolyte temperature reaches 125° F. or some other predetermined fixed temperature. The battery is charged at a predetermined high rate until the fixed maximum temperature is reached.

It has been found that, in actual practice, the maximum temperature cutoff method of charging results in the overcharging of batteries initially cool, and undercharging of batteries initially warm. Actual commercial practice has disproved the theory upon which the maximum temperature cutoff method is based. Though this method has the advantage of simplicity and freedom from manual adjustments, it has the serious disadvantage of frequently giving a result different from that desired by the operator. As will be apparent from latter discussion herein, this method also frequently requires the expenditure of more time than is necessary or desirable.

An object of the present invention is to provide a novel method for charging batteries which will be free from the above mentioned disadvantages of the time switch and maximum temperature methods of charging.

A further object of the invention is to provide such a method whereby danger of serious overcharging is substantially eliminated.

A further object of the invention is to provide a method and apparatus for charging storage batteries whereby the state of charge of the battery is raised either to a predetermined value or to a practical maximum, as desired, with minimum requirements of time and manual adjustments.

A further object of the invention is to devise a method and apparatus for charging any storage battery to from 70% to 100% of full charge, regardless of the initial state of charge of the battery, without requiring tests of the battery or any manual adjustment of the charging apparatus.

A further object of the invention is to provide a method and apparatus for charging storage batteries wherein the duration of charging is controlled by a predetermined rise in internal temperature of the battery above its initial value during charging.

A still further object of the invention is to devise apparatus for charging batteries, whereby duration of charging is controlled in accordance with completion of a predetermined rise in internal temperature of the battery during charging, said apparatus including means for preventing occurrence of excessive battery temperatures during charging.

Yet another object of the invention is to provide a method for charging storage batteries either to a practical maximum state of charge or to a predetermined state of charge without exceeding the safe maximum value of the internal temperature of the battery, even though the initial internal temperature of the battery is relatively high.

In order that the invention may be understood in detail, reference is had to the accompanying drawings which form a part of this specification, and wherein.

Figure 1:
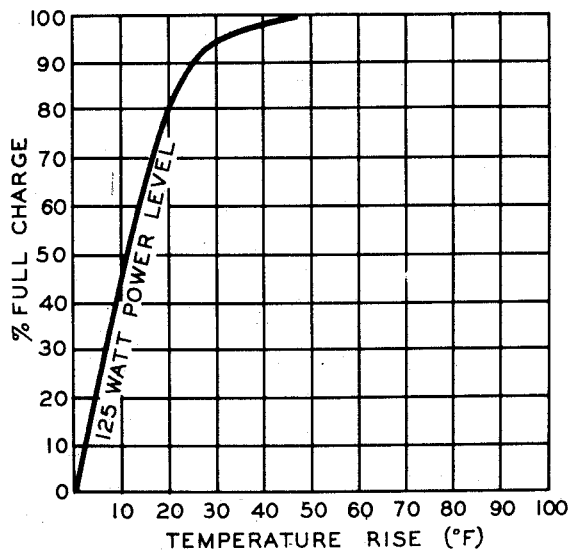
Fig. 1 is a diagram showing the curve obtained by plotting temperature rise against increase of charge exhibited by various sizes of fully discharged batteries during charging at a power level of 125 watts.

To assist in a ready understanding of our invention and proper interpretation of the appended claims, we define the following terms which will be employed:

(1) By internal temperature of a battery, we mean the temperature of the battery as measured by a heat sensitive device in good thermal contact with the battery electrolyte. The initial internal temperature is the internal temperature of the battery at the time of starting the charge.

(2) By temperature rise, we mean the rise of the internal temperature of the battery above its initial value. For example, when a battery having an initial internal temperature of 75° F. has been charged until its internal temperature reaches 135° F., the internal battery temperature has traversed a tempreature rise of 60° F.

(3) By a fixed maximum internal temperature of a battery we mean a single temperature predetermined for purposes of controlling or terminating some condition. A common example is that temperature specified by battery manufactures as being the internal temperature of the battery which cannot be safely exceeded during charging. By coincidence, the temperature at the end of a temperature rise may be this predetermined temperature.

(4) By power level of charging, we mean the average power level of the $E_{dc}$—$I_{dc}$ curve of the output of the charger employed. This definition will be hereinafter amplified.

In describing the invention, it will be necessary to refer to the state of charge of batteries. There are in the art at the present time several methods for determining state of charge of storage batteries. By the method usually employed in automotive service stations, a 6-volt battery is said to be fully discharged for practical purposes when it gives a hydrometer reading of sp. gr. 1.150–1.160, this being the state of charge below which the battery will ordinarily not turn a cold engine by the starter motor. By a more accurate method adopted by battery manufacturers, however, a 6-volt battery is said to be fully discharged when it exhibits a terminal voltage of 5.25 volts under the 20-hour load. By this latter method, a fully discharged battery is obtained for test purposes by discharging at the 20-hour rate ($1/20$ × amp.-hr. capacity of the battery) until the terminal voltage reaches 5.25 volts. It can be shown that a 6-volt battery exhibiting a hydrometer reading of 1.150–1.160 by the service station method of testing is actually about 35–40% charged, based on 0% as a state of charge giving a terminal voltage of 5.25 volts, in the case of 6-volt batteries. Percentages of charge, when given hereinafter, are based on 0% as attained by discharging at the 20-hour rate until a terminal voltage of 5.25 volts results.

We have discovered that the temperature rise of a battery during charging bears a definite relationship to the increase in state of charge of the battery, and that this relationship between temperature rise and increase in state of charge is a fixed relationship, independent of the charging current, the battery size and the initial battery temperature, when the battery is charged by an apparatus with a substantially constant power level output.

To determine the relationship between temperature rise and increase in state of charge, we have made numerous tests on standard lead-acid, automotive type storage batteries. These tests have taken the form of charging runs made at a substantially constant power level on batteries with initial internal temperatures ranging from 20° F. to 80° F. Data for twelve representative charging runs is as follows:

| No. | Btty. Capacity | Initial Temp., ° F. | Temp. Rise, ° F. | Per Cent Full Charge | Per Cent Efficiency of Charge | Duration of Charge in Minutes | Initial $I_{dc}$ Amps. |
|---|---|---|---|---|---|---|---|
| 1 | 100 | 35 | 36 | 70 | 95.8 | 68 | 77.0 |
| 2 | 100 | 58 | 20 | 45.1 | 100.0 | 37 | 81.0 |
| 3 | 100 | 71 | 43 | 72.5 | 81.8 | 81 | 79.0 |
| 4 | 120 | 20 | 80 | 100.0 | 65.9 | 210 | 52.0 |
| 5 | 80 | 18 | 60 | 87.5 | 83.3 | 110 | 36.0 |
| 6 | 80 | 20 | 80 | 97.0 | 65.4 | 144 | 53.5 |
| 7 | 80 | 20 | 40 | 71.0 | 95.7 | 67 | 57.0 |
| 8 | 80 | 23 | 72 | 90.0 | 69.8 | 125 | 45.0 |
| 9 | 120 | 66 | 21 | 48.6 | 96.0 | 51 | 76.0 |
| 10 | 120 | 73 | 30 | 62.0 | 96.0 | 68 | 81.5 |
| 11 | 120 | 70 | 11 | 26.8 | 95.5 | 26 | 82.0 |
| 12 | 120 | 24 | 53 | 82.0 | 76.8 | 142 | 62.0 |

These twelve representative charging runs were made at a power level of approximately 500 watts.

For purposes of simplicity, data given above has been limited to charging runs made on fully discharged batteries. Tests were made under both adiabatic and non-adiabatic conditions, and it was found that the results were the same in either case. Since the lowest charging current employed was 12 amperes, the tests show that heat lost from the battery during charging is negligible when compared with heat generated, even when a power level substantially below 100 watts is employed. It should be noted, however, that this statement holds true only when the temperature of the battery is not greatly above ambient temperature. Should the temperature of the battery be substantially greater than ambient temperature, there may be sufficient heat lost from the battery to vary the charging time required to cause the battery temperature to complete a given rise. When the statement is made hereinafter that, in practicing this invention, a charging rate is chosen which is sufficiently high that heat lost from the battery is negligible when compared with the heat generated due to charging, it is to be understood that this statement implies that the battery is initially substantially at ambient temperature. Conventional fast chargers of the constant voltage source type were employed throughout the tests.

The tests upon which the curve shown in Fig. 1 is based were made by charging at a power level of 125 watts various sizes of batteries ranging in capacity from 80 ampere hours to 120 ampere hours. The initial internal battery temperatures involved ranged from 20° F., a practical lower limit determined by the freezing point of the electrolyte, to well above 70° F. Thus, the tests show the relationship between temperatures rises and increase in state of charge to be the same for fully discharged batteries, regardless of the battery size and the initial internal temperature.

Figure 2:
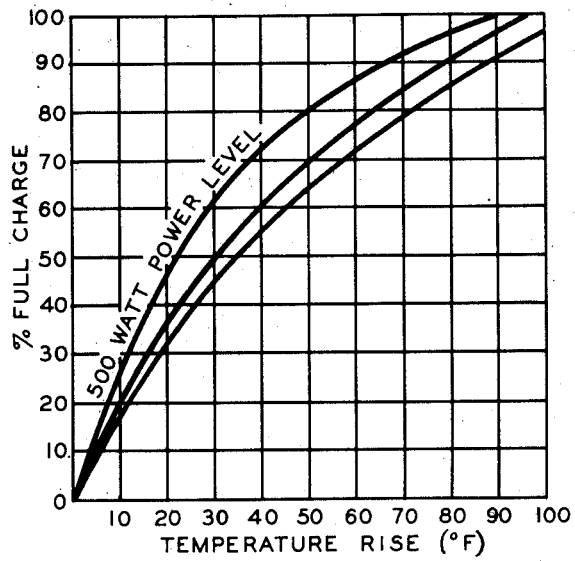
Fig. 2 is a diagram showing curves similar to that shown in Fig. 1 for initially completely discharged batteries charged at different power levels.

The tests further show that the relationship between temperature rise and increase in state of charge is dependent upon the power level of charging. This is illustrated in Fig. 2, wherein the three curves represent the results of charging runs carried out at 500 watt, 800 watt, and 1100 watt power levels, respectively. As in the case of the 125 watt power level curve of Fig. 1, the three curves shown in Fig. 2 are based on many charging runs on batteries of different sizes and at different initial internal temperatures, indicating again that the temperature rise versus increase of charge curve is independent of battery size and initial temperature. It will be seen that the curve flattens out as the power level is increased. But, even in the case of an 1100 watt power level, 65% of full charge is attained in the first 50° F. of temperature rise, and in the case of a 450–500 watt power level, the first 50° F. of temperature rise gives 80% of full charge.

Since it has ben found that the relation between temperature rise and increase of charge is dependent upon power level, a detailed consideration of this factor is pertinent to a clear understanding of the invention. In its narrowest sense, the term power level refers to the instantaneous valve of the power flowing into the battery from the charger. In the conventional charger operating from an alternating current source, a rectifier is employed to convert the alternating current to direct current, and because of the nature of the rectifier the current supplied to the battery is of a pulsating nature, that is, it periodically varies from zero to a maximum and back to zero, with a certain amount of dead space between the end of one pulse and the beginning of the next. Since the current varies from zero to a maximum and back to zero again, the actual power flowing into the battery varies likewise, and it may be said that the power level, using the term in its narrow sense, is also varying from zero to a maximum and back to zero. It is therefore obvious that, for practical purposes, the power level must be considered as the integrated average of this fluctuating power over a time interval relatively long compared to the pulse frequency.

Charges of the type operating from a fixed voltage alternating current supply and employing a dry plate rectifier have the inherent characteristic that the charging current ($I_{dc}$) varies inversely as the charging voltage at the battery terminals ($E_{dc}$). This relation between the charging current and the terminal voltage of the battery is independent of the particular battery being charged and, for a given charger and a given alternating current supply voltage, a characteristic $E_{dc}$—$I_{dc}$ curve may be plotted. The slope of the $I_{dc}$—$E_{dc}$ curve is a function of the resistance of the charging circuit for a given supply voltage, the higher the resistance, the flatter being the curve. Consequently, the comparatively low resistance rectifiers, such as those of the selenium and copper oxide types, tend to give a much steeper $E_{dc}$—$I_{dc}$ curve than do the higher resistance rectifiers, such as those of the copper sulfide-magnesium type.

Figure 3:
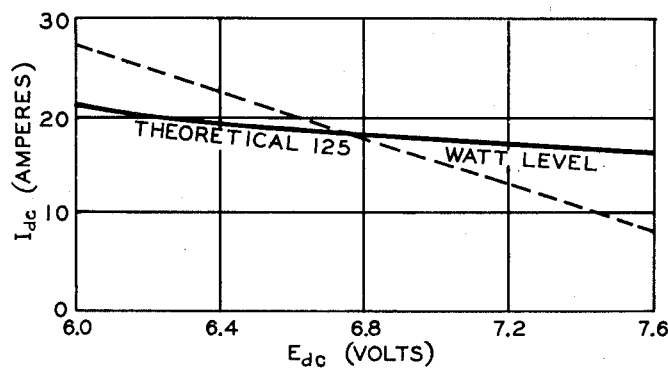
Fig. 3 is a diagram illustrating the relation between a theoretical power level curve of 125 watts and an actual 125 watt power level curve for a typical constant voltage supply battery charger employing a high resistance rectifier.

It is possible to plot a theoretical curve of $E_{dc}$—$I_{dc}$ on which all points have the same power level and such a curve is referred to as a constant power level curve. The solid line of Fig. 3 shows a curve for the constant power level of 125 watts. In contrast therewith, there is shown by the dotted line of Fig. 3 the actual $E_{dc}$—$I_{dc}$ curve for one adjustment of a battery charger, employing a high resistance rectifier of the copper sulfide-magnesium type. Using the broad definition of power level given earlier in this specification, it can be stated that this battery charger, when adjusted to give the $E_{dc}$—$I_{dc}$ curve shown by the dotted line of Fig. 3, has a power level of charging of 125 watts. The relationship between the slope of the actual $E_{dc}$—$I_{dc}$ curve of the charger and the constant power level curve remains reasonably the same for all adjustments of the charger. Consequently, a battery charged by a charger of this type, will remain substantially at the same power level regardless of how the charging current may vary with battery voltage as influenced by battery temperature, battery age, or state of charge.

We have found that the greater the deviation of the actual $E_{dc}$—$I_{dc}$ curve from the corresponding theoretical constant power level, the greater will be the deviation of observed values of temperature rise and state of charge from the curve shown in Fig. 1. We believe this to be due to the wide variation of output voltage ($E_{dc}$) at the battery with varying conditions such as temperature, age and state of charge of the battery. This means, in effect, that charging will be at different power levels for different conditions, and the results will obviously not conform to a curve dependent on one particular power level. It is therefore highly desirable when practicing the present invention to maintain the actual $E_{dc}$—$I_{dc}$ curve of the charger as close as possible to the corresponding theoretical constant power level. This may be accomplished by employing a high resistance rectifier or by employing a lower resistance rectifier supplemented by an auxiliary resistance.

It should also be noted, in connection with the consideration of the choice of power level, that while this choice should be made with reasonable precision when lower power levels are employed, considerably greater variation is allowable if higher power levels are to be employed.

Figure 4:
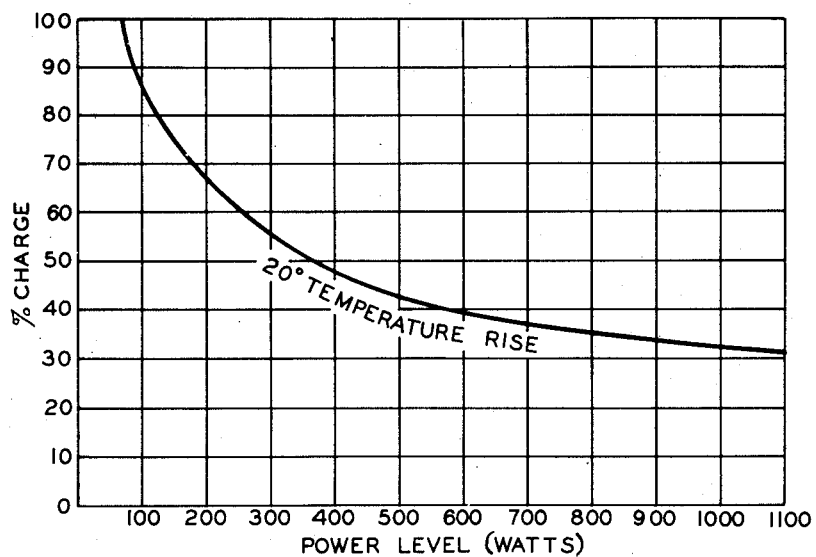
Fig. 4 is a diagram showing the curve obtained by plotting per cent increase of charge obtained from charging initially fully discharged batteries at various power levels through a temperature rise of 20° F.

The effect of choosing different power levels of charging will be particularly clear from an inspection of the curve illustrated in Fig. 4, where the per cent increase of charge obtained for a 20° temperature rise, is plotted at various power levels ranging from 100 to 1100 watts. Referring to Fig. 4, it will be seen that an increase in power level from 100 to 200 watts results in a drop of per cent charge of 15%, while at the other end of the curve an increase in power level from 800 to 900 watts results in a drop of per cent charge of only about 2½%. Thus, it is the general rule that a given temperature rise produced by a relatively low power level of charging will result in a relatively large increase in state of charge, while the same temperature rise produced by a relatively high power level results in a relatively small increase.

Figure 5:
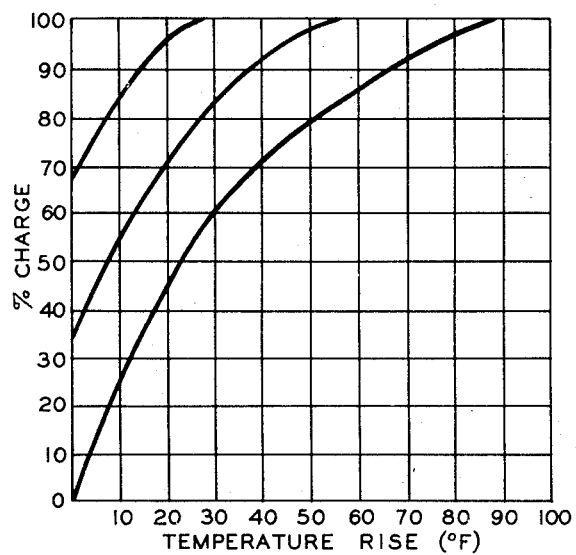
Fig. 5 is a diagram showing curves obtained by plotting temperature rise against increase of charge at a power level of 500 watts for batteries initially fully discharged, initially 35% charged, and initially 67% charged, respectively.

The tests also show that, if the initial state of charge of the battery is greater than zero, the temperature rise versus increase-of-charge curve will be offset from, but generally parallel to, the same curve resulting from charging a fully discharged battery, presuming that the same power level of charging is employed in each instance. This is shown in Fig. 5, where a family of such curves is illustrated for 500 watt power level charging of batteries initially fully discharged, initially 35% charged, and initially 67% charged. Here, it is seen that a 40° temperature rise will yield slightly better than 70% full charge in the case of a battery initially fully discharged, in excess of 90% full charge in the case of a battery initially 35% charged, and a slight "overcharge" in the case of a battery initially 67% charged.

From the temperature rise versus increase-of-charge curves illustrated, it will be seen that a battery at a known initial state of charge can be brought to any desired state of charge by charging at a definite power level and terminating charging when the internal temperature of the battery has risen to the required extent, the extent of rise being determined by the power level chosen. The temperature rise required to give various desired increases in state of charge can be determined readily and tabulated in chart form by the manufacturer of the battery charger. Since battery size and temperature do not affect the relationship, these factors require no test or compensating adjustment of the charger. Though the initial internal temperature of the battery must be determined, it will be shown hereinafter that, when the preferred apparatus is employed, such determination can be made automatically, without depending upon the human element. The question of power level resolves itself into the adjustment of the charger tap switch, when battery chargers now conventional in the art are employed, since the rectifier characteristics are determined by the manufacturer of the charger. According to the present method, if precise charging is to be done, all that is required of the operator of the battery charger is to determine the initial state of charge of the battery and choose the proper temperature rise corresponding with the power level employed.

Though the precise results attained by the method of charging just outlined are frequently desired, we have found in the course of our experiments that the accuracy of this method exceeds the requirements of accuracy involved in many types of commercial charging operations. For example, as previously pointed out, most automotive batteries presented for charging at service stations and the like as "fully discharged" are in fact 35–40% charged. It is more than sufficient for automotive purposes if the state of charge of the battery is increased to at least 70% of full charge. By reference to Figs. 2 and 5, it will be seen that, when a power level of charging of 500 watts is employed, a fully discharged battery can be brought to 70% charge by charging through a 37° temperature rise, while if the battery is initially 35% charged, charging through the same temperature rise will result in better than 90% of full charge. It is therefore obvious that a charging apparatus constructed to charge at 500 watts and arranged to terminate charging upon completion of a temperature rise of about 40° would successfully charge almost all automotive storage batteries presented at service stations for charging. Similarly, the same would be true for a charging apparatus charging at 800 watts and terminating charging at about 50° temperature rise.

In fact, for any selected power level ranging from 100 to 1100 watts, there is a corresponding temperature rise which will always give at least 70% of full charge, though an intermediate level is obviously somewhat more advantageous. Further, the corresponding temperature rise is not absolutely definite; in the case of a 500 watt power level of charging, the temperature rise could be in the range of from 35 to 60°, depending upon the results required and upon the initial internal temperatures of the batteries most likely to be encountered in use of the apparatus.

For automotive battery charging, the use of a single predetermined temperature rise and corresponding power level of charging for all batteries, regardless of initial state of charge, offers several important advantages. First, it eliminates the necessity of making any preliminary test of the battery to determine state of charge. Second, it eliminates the necessity of referring to a table of values to determine the proper temperature rise for each battery. Third, it makes possible the use of a charging apparatus which will require the operator only to operate a simple on-off switch. Fourth, by making use of only the temperature rise period in which the greatest amount of charge is put into the battery, it increases the efficiency of the charging operation, and "overcharging" is materially reduced.

Figure 6:
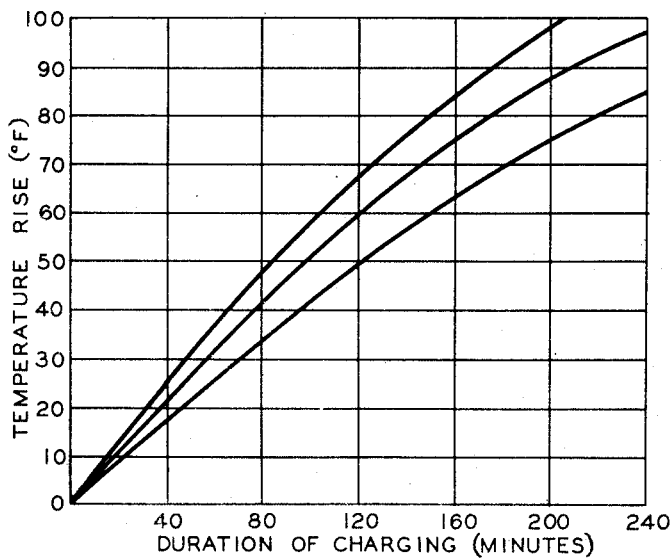
Fig. 6 is a diagram showing the curves obtained by plotting temperature rise against charging time for various sizes of batteries charged at a 500 watt power level.

The importance of this last factor will be seen more clearly with reference to Fig. 6, wherein the relationship between temperature rise and duration of charging in minutes is illustrated for three sizes of batteries charged at a power level of 500 watts. In practice it has been proved that the increased time periods of charging necessary to attain temperature rises in excess of 60° are usually spent largely in overcharging the battery, since the batteries presented for charging are rarely at an initial state of charge of less than 35%. If a battery is to be charged by the prior art maximum temperature cutoff method, and the maximum temperature employed is 125°, the initial state of charge of the battery is 35%, and the initial internal temperature 60°, as is likely to be the case in relatively cool weather, the maximum temperature cutoff method will require charging until a temperature rise of 65° is completed. If the power level of charging is 500 watts, the battery will be substantially fully charged at 45° temperature rise, resulting from charging for about 80-90 minutes. But the maximum temperature cutoff method requires that charging continue for an additional 20° of temperature rise requiring 30-40 minutes of charging. Since much of this additional charging is "overcharging," the additional time is, in effect, wasted.

In general, the temperature rise method of charging can be applied in four different manners. As just described, a fixed power level and a fixed temperature rise may be used, these two values being chosen in accordance with the particular conditions under which the charging is to be done. Conversely, both the power level and the temperature rise may be selected by the operator to suit each particular battery to be charged. Also, a fixed power level may be employed, and the temperature rise alone selected to suit each particular case, or conversely, a fixed temperature rise may be employed and the power level alone selected to suit each case.

The method may be carried out entirely manually by inserting a conventional thermometer in the battery, determining the initial internal temperature, charging at a predetermined power level, continuously observing the temperature rise resulting from charging, and manually interrupting the flow of charging current to the battery when the internal temperature of the battery has traversed a predetermined rise.

The method can also be accomplished by the use of an adjustable thermostatic switch substituted for the fixed thermostatic switch of a conventional thermally controlled charging apparatus such as that shown in Patent 2,354,877 to Peters. In such case, the switch is adjusted to act at the initial internal temperature of the battery and is thereafter immediately adjusted to act again at a predetermined higher temperature, setting the upper limit of the temperature rise. The thermostatic switch ordinarily controls a relay circuit, the relay making and breaking the charging circuit, and it is obvious that, since the relay may be either of the normally open or normally closed type, the thermostatic switch will be either closed on open, respectively, during the temperature rise.

We prefer, however, to employ an automatic temperature-responsive control circuit, as hereinafter described, which can be adjusted to the initial temperature of the battery, then adjusted again to respond to completion of a predetermined rise of internal temperature of the battery over its initial value, and which will continuously detect the progressive change of battery temperature and automatically terminate the charge upon completion of the selected temperature rise.

Figure 7:
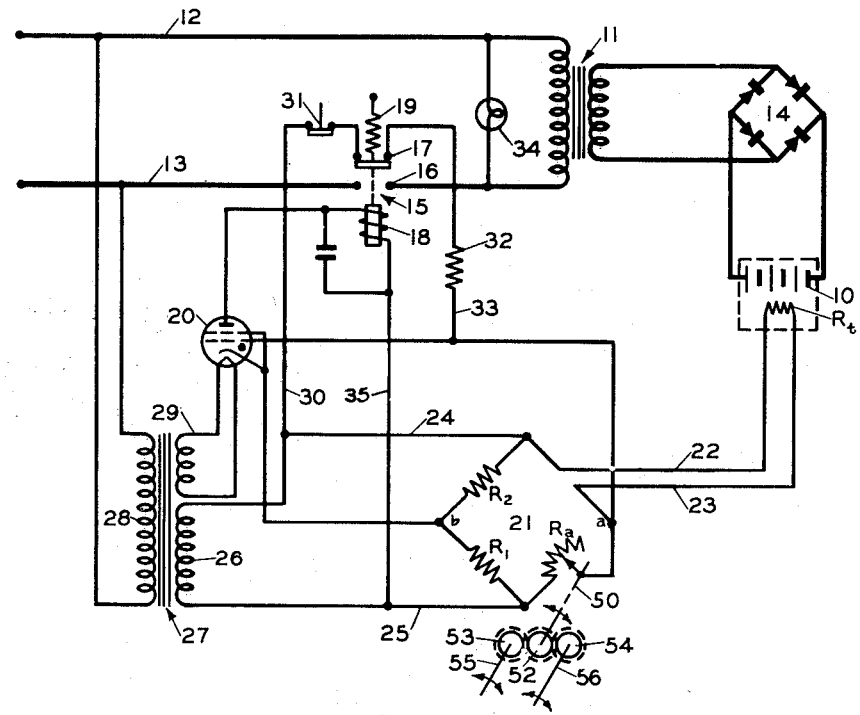
Fig. 7 is a schematic diagram of one preferred form of manually adjustable charging apparatus constructed according to the invention.

A simple form of such apparatus is illustrated diagrammatically in Fig. 7. Here, battery 10 is supplied with charging current by a conventional charging circuit comprising transformer 11, alternating current supply leads 12 and 13, and a suitable conventional rectifier 14.

Located at a convenient point of the charging circuit just described is a contactor 15, in the present embodiment illustrated as a relay comprising a circuit closing member movable between and adapted to bridge either a first set of contacts 16 in supply lead 13 of the charging circuit or a second set of contacts 17 controlling a circuit to be hereinafter described. The relay is provided with an actuating winding 18 and is normally biased, as by spring 19, to close contacts 17 and open contacts 16, energization of the actuating winding causing contacts 16 to be closed and contacts 17 to be opened.

Winding 18 is connected in the plate circuit of a thermionic tube 20, and the cathode and control grid of tube 20 are connected across the output points $a$, $b$, of a Wheatstone bridge 21. Bridge 21 comprises standard resistances $R_1$ and $R_2$ making up two arms of the bridge, a resistance $R_a$ in a third arm, and, in the arm balancing said third arm, a thermally responsive resistance $R_t$ having a negative temperature coefficient. $R_t$ is preferably a thermistor of that general type prepared by molding and firing mixtures of semi-conductive oxides of such metals as manganese, nickel, cobalt and copper, usually with a binder such as sodium silicate.

Such thermistors are available to the trade in either rod or disc form. We prefer to employ such a molded thermistor of rod form having approximate dimensions on the order of ½ inch in length and ⅛ inch in diameter. When such a thermistor is employed, it may be necessary to include an additional fixed resistance in series therewith to bring the thermistor arm of the bridge up to a convenient resistance value, though it is more desirable to use $R_t$ alone, where a thermistor of sufficiently high value is available.

Thermistor $R_t$ is connected into bridge 21 by conductors 22 and 23. It will be understood that, in commercial practice, the components of the electrical circuits described are housed in a casing, and the charging circuit is connected to the battery by suitable insulated leads. Accordingly, conductors 22 and 23 are embodied in a flexible insulated cable of sufficient length to reach from the casing to the battery. As described in co-pending application, Serial No. 137,804, filed January 10, 1950, by Lewis A. Medlar, now Patent 2,526,251, thermistor $R_t$ is provided with a suitable casing of such a nature that the thermistor can be brought into good thermal contact with the battery electrolyte by being inserted through one of the filling openings in the battery casing. The mechanical arrangement of the thermistor $R_t$ and its associated casing forms no part of the present invention, being claimed in the aforesaid application, Serial No. 137,804.

Bridge 21 is supplied by conductors 24 and 25 connected to secondary winding 26 of transformer 27, the primary winding 28 of which is connected across the alternating current supply of the charging circuit. Transformer 27 is provided with a supplementary secondary winding 29 for supplying the heater of tube 20.

Thermionic tube 20 is preferably of the type generally known in the art as a thyratron. When used with alternating current voltages on the plate and grid, such tubes are conductive only when the plate is positive with respect to the cathode and the grid is positive or nearly positive with respect to the cathode. Stated differently, when the plate and grid voltages with respect to the cathode are in phase, the tube will conduct, but when the plate and grid voltages are 180° out of phase, the tube will not conduct. Thus, to determine whether or not such a tube will conduct, the control voltage on the grid must not only be of sufficient amplitude but it must also be of the proper phase relationship with the plate voltage. Other thermionic tubes than the thyratron can be used.

When the bridge 21 is balanced, there is no potential across the output terminals $a$, $b$. Unbalance of the bridge in one sense causes a potential of one phase across the output terminals, while unbalance in the opposite sense reverses the phase of this potential. The output terminals of the bridge are connected to the control electrode and the cathode of tube 20. Therefore, as the bridge swings through the balance point, the phase of the potential at the control electrode of tube 20 reverses, and the tube will become either conductive or non-conductive, depending upon the sense of unbalance of the bridge.

It will be understood, by those skilled in the art that the precise instant at which the tube becomes conductive or non-conductive during the swing of the bridge through the balance point will depend upon the particular characteristics of the tube used in the circuit, and that, in fact, a particular tube may become conductive upon occurrence of a grid potential such as $-1$ volt at a plate potential of $+110$ volts, which in the present apparatus represents a slight unbalance of the bridge. Accordingly, when in this specification and appended claims we state that balancing of the bridge, or the swinging of the bridge through the balance point, actuates the tube, we mean this terminology to include those cases where the tube responds as the bridge closely approaches the balance point.

Value of the arms of the bridge 21 comprising $R_t$ and $R_a$ must be of such magnitude that the supply voltage of the bridge will not generate so much heat as to produce an appreciable increase in the temperature of $R_t$. The ratio of $R_t$ to $R_a$ must be the same at the balance point of the bridge as the ratio of $R_2$ to $R_1$.

Contacts 17 of relay 15 control a circuit consisting of conductor 30, a normally closed push-button switch 31, a resistance 32, and a conductor 33, this circuit being so arranged as to connect resistance 32 in parallel with $R_t$ when contacts 17 are closed. The plate circuit of tube 20 is connected, by conductor 35, to conductor 25.

A signal 34, such as a pilot lamp, is connected across the charging circuit on the battery side of relay 15, whereby the operator can observe whether or not the charging circuit is energized.

When the device of Fig. 7 is to be employed to charge a battery by the temperature rise method, the operation is as follows: With the rectifier output connected to the battery and thermistor $R_t$ inserted in the battery, leads 12 and 13 are connected to a suitable source of alternating current. The internal temperature of the battery will, ordinarily, be relatively low, and the resistance of thermistor $R_t$ will therefore be relatively high. If the initial value of resistance $R_a$ is substantially less than that of the thermistor $R_t$, bridge 21 will be unbalanced in a sense causing tube 20 to be conductive, winding 18 of relay 15 to be energized, and contacts 16 to be closed, energizing the charger and also energizing signal 34. Resistance $R_a$ is now adjusted until bridge 21 just balances, tube 20 becomes deenergized, and contacts 16 are therefore opened, breaking the charging circuit and de-energizing signal 34. At this point, it will be seen that, since bridge 21 is in a balanced condition with thermistor $R_t$ at the initial internal temperature of the battery, the adjustment of resistance $R_a$ is a function of the initial internal temperature of the battery. With push-button switch 31 held in open position, resistance $R_a$ is now adjusted to decrease its value a predetermined amount, dependent upon the particular temperature rise, determined by the operator, corresponding with the increase in state of charge required. So decreasing the value of resistance $R_a$ again unbalances bridge 21 in a sense causing tube 20 to be conductive, winding 18 to be energized, and contacts 16 in the charging circuit to be closed. Charging of the battery will therefore proceed from the moment of unbalancing of the bridge. As charging continues, the internal temperature of the battery rises, and the resistance of thermistor $R_t$ therefore decreases. Upon completion of the temperature rise determined by the last adjustment of resistance $R_a$, the resistance of thermistor $R_t$ will have decreased to an extent such that bridge 21 is substantially rebalanced, and as this occurs, tube 20 will again become non-conductive, winding 18 will be de-energized, contacts 16 will be opened, breaking the charging circuit and so terminating charging, and contacts 17 will be closed by reason of spring 19.

Closing of contacts 17 completes a circuit comprising conductors 30, normally closed push-button switch 31, resistance 32 and conductor 33, so connecting resistance 32 in parallel with thermistor $R_t$. The value of resistance 32 is, by reason of choice or adjustment, less than the value of thermistor $R_t$ when the thermistor is at the highest cutoff temperature for which the apparatus can be adjusted. Therefore, when contacts 17 are closed, the apparatus will be locked in "off" position, since so long as resistance 32 is connected in parallel with thermistor $R_t$, the bridge cannot be rebalanced by any change in value of thermistor $R_t$ to cause tube 20 to be conductive. When the charger is to be energized for charging another battery, it is merely necessary to momentarily open push-button switch 31, since, when thermistor $R_t$ is at a relatively higher resistance value than resistance $R_a$, as is ordinarily the case at the time of starting the charge when $R_t$ is at the initial internal temperature of the battery, the bridge 21 would be unbalanced in a sense causing tube 20 to be conductive, were it not for the presence in the circuit of resistance 32. It will, of course, be understood that, when the circuit of resistance 32 is momentarily broken by actuation of push-button switch 31, tube 20 becomes conductive, and therefore contacts 17 are broken, so eliminating resistance 32 from the circuit until such time as tube 20 again becomes non-conductive.

In some respects, the apparatus shown in Fig. 7 and just described is similar to that disclosed in our co-pending application, Serial No. 87,494, filed April 14, 1949, now Patent Number 2,529,038. In that application, we have described and claimed an apparatus wherein a thermistor responsive to battery temperature controls a relay in the charging circuit to interrupt charging when a predetermined battery temperature is reached, regardless of the initial battery temperature. In the present invention, the temperature responsive control is such that charging is terminated when the battery temperature has increased by a predetermined amount over its initial value. In other words, application Serial No. 87,494 is directed to a maximum temperature cutoff device, while the present invention, though it may involve apparatus similar in some respects to that of the aforementioned application, maintains a predetermined temperature rise, selected either by adjustment or by an automatically resettable control element.

Figure 8:
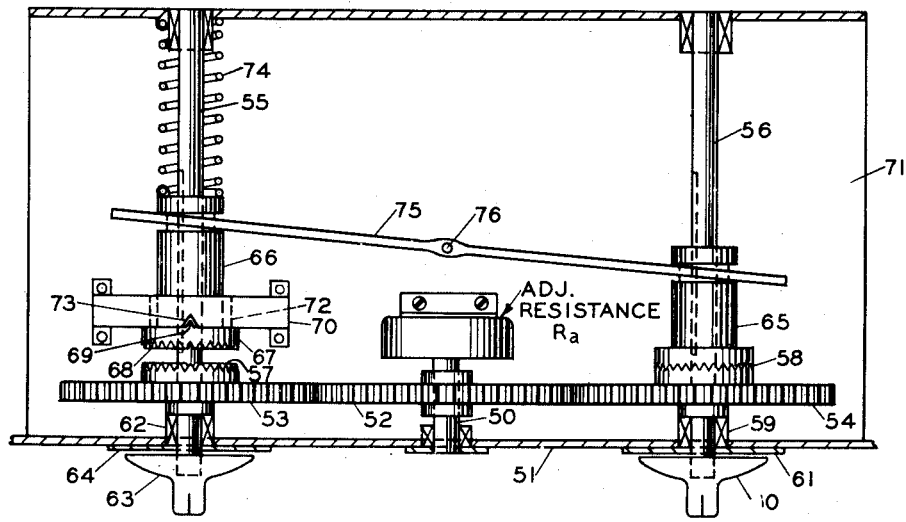
Fig. 8 is a plan view, partially in section, of an adjusting mechanism employed with the apparatus illustrated in Fig. 7.

In order that the operator shall be able to perform the necessary two-stage adjustment of resistance $R_a$ conveniently, and without necessitating special technical knowledge on the part of the operator, we have provided a special adjusting mechanism whereby the two adjustments are made independently of each other as far as the operator is concerned. A preferred form of this mechanism is shown in Fig. 8. For convenience, we will refer to the first adjustment of resistance $R_a$, by which the bridge is just balanced to de-energize the charging circuit, as the "start" adjustment, and to the second adjustment of resistance $R_a$, by which the bridge is unbalanced an amount proportional to the desired temperature rise, as the "run" adjustment.

We prefer to employ mechanism which will provide the operator with separate adjusting knobs for making the "start" and "run" adjustments. Referring now to Fig. 8, it will be seen that resistance $R_a$, which may be any conventional potentiometer of proper value, is mounted by having its adjusting shaft 50 journalled in panel 51 of the charger casing. Keyed to shaft 50 is a gear 52 meshing with gears 53 and 54. Gears 53 and 54 are carried by, but freely rotatable on, shafts 55 and 56, respectively, and are respectively provided with serrated clutch facings 57 and 58. Shaft 56 is journalled in panel 51, as at 59, and is provided with adjusting knob 60 having a suitable pointer cooperating with a dial 61. Shaft 55 is journalled in panel 51, as at 62, and is provided with adjusting knob 63 having a suitable pointer cooperating with dial 64.

Keyed to shaft 56, but slidable thereon, is a clutch member 65. The surface of member 65 adjacent gear 54 is serrated to cooperate with serrated clutch facing 58 on gear 54. Keyed to shaft 55, but slidable thereon, is a clutch member 66 having an enlarged portion 67. Portion 67 is provided with a serrated clutch surface 68 capable of cooperating with clutch facing 57 on gear 53. On the opposite surface, portion 67 of member 66 is provided with a cam 69. A fixed member 70, rigidly supported as by horizontal panel 71, is provided with a bore 72, through which the hub of clutch member 66 may pass freely, and a cam slot 73 designed to cooperate with cam 69. Clutch member 66 is urged toward fixed member 70, as by tension spring 74, so that cam 69 may normally seat in cam slot 73, and clutch surface 68 is then spaced from clutch face 57 a distance equal to the height of cam 69. Clutch members 65 and 66 are interconnected for simultaneous sliding action by a lever 75 pivoted at 76 to horizontal panel 71.

Knob 60 is employed to make the "start" adjustment of resistance $R_a$, and knob 63 to make the "run" adjustment. It will be seen that, when the parts of the mechanism are in the positions shown in Fig. 8, clutch 65 engages the cooperating clutch facing on gear 54, while clutch facings 57 and 68 are out of engagement. Thus, rotation of knob 60 will adjust resistance $R_a$. In actual operation of the apparatus, presuming that the battery to be charged is at a relatively low internal temperature, and thermistor $R_t$ is therefore at a relatively high resistance value compared to resistance $R_a$, the operator's first act will be to rotate knob 60 in a direction causing resistance $R_a$ to be increased, rotation of the knob being stopped when bridge 21, Fig. 7, becomes balanced, as evidenced by signal 34. As has been previously pointed out, at this point the adjustment of resistance $R_a$ is a function of the internal temperature of the battery. Therefore, the position of adjusting knob 60 at the end of the "start" adjustment is indicative of the initial internal temperature of the battery, and dial 61 can therefore be calibrated in terms of temperature if desired.

After the "start" adjustment has been made by manipulation of knob 60, the "run" adjustment is made by rotation of knob 63. It will be seen from Fig. 8, that, when knob 63 is first rotated, the resulting rotation of member 66 relative to fixed member 70 will cause cam 69 to ride out of cam slot 73, thereby bringing clutch facings 68 and 57 into engagement, whereby further rotation of knob 63 will result in adjustment of resistance $R_a$ through gears 53 and 52. Also, as cam 69 rides out of cam slot 73, lever 75 pivots to disengage clutch member 65 from gear 54, leaving gear 54 freely rotatable relative to shaft 56. In making the "run" adjustment, knob 63 is rotated so as to decrease the resistance of $R_a$. The final position of knob 63 is dependent upon degrees of temperature rise desired. However, the average operator of a battery charger in commercial practice is not interested in, and may not understand, the significance of the amount of temperature rise required to bring about a desired increase in state of charge of the battery.

Figure 9:
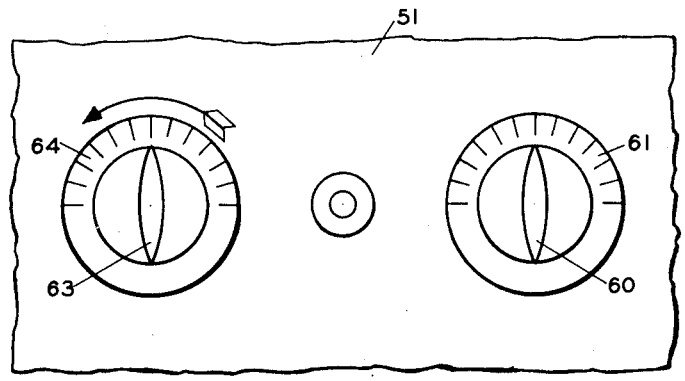
Fig. 9 is a front elevation of the calibrated dials employed with the adjusting mechanism shown in Fig. 8.

The "run" adjustment may be calibrated in two different manners. If the charger employs a tap switch to adjust the transformer output and thus adjust the power level, dial 64, Fig. 9, should be calibrated in terms of temperature rise. On the other hand, if the charger employs only one fixed power level, and the transformer tap switch is eliminated, dial 64 should be calibrated in terms of percent of full charge. Fig. 9 illustrates a preferred panel arrangement. It will be understood that it is not necessary that dial 61 be calibrated at all, since completion of the "start" adjustment is determined by deenergization of signal 34.

In the preferred form of the adjusting mechanism shown in Fig. 8, it is necessary that, after each charging operation, adjusting knob 63 be returned to its original position, so that cam 69 seats in cam slot 73, clutch facings 57 and 68 are disengaged, and clutch member 65 engages clutch facing 58 on gear 54. Return of knob 63 to its original position returns resistance $R_a$ to the value determined by the original "start" adjustment. Knob 60 can then be zeroed, if the operator so desires, but this is not necessary.

As previously pointed out, it may, in certain commercial applications, be desirable to charge any battery presented for charging through a standard temperature rise in order to obtain an optimum charge without making any tests or adjustments whatever. In that event, resistance $R_a$ Fig. 7, is made non-linear to match the non-linearity of thermistor $R_t$, so that a given adjustment of resistance $R_a$ will always determine a given temperature rise, regardless of the initial temperature of the thermistor. The dial for the "run" knob is provided merely with two definite positions, which may be designated "off" and "on." The operator simply first manipulates the "start" knob until the signal 34 responds, and then moves the "run" knob from the normal "off" to the "on" position. That is all. The charger will thereupon charge the battery through the standard temperature rise for which the charger is designed, and will automatically cut off when this temperature rise has been traversed.

Figure 10:
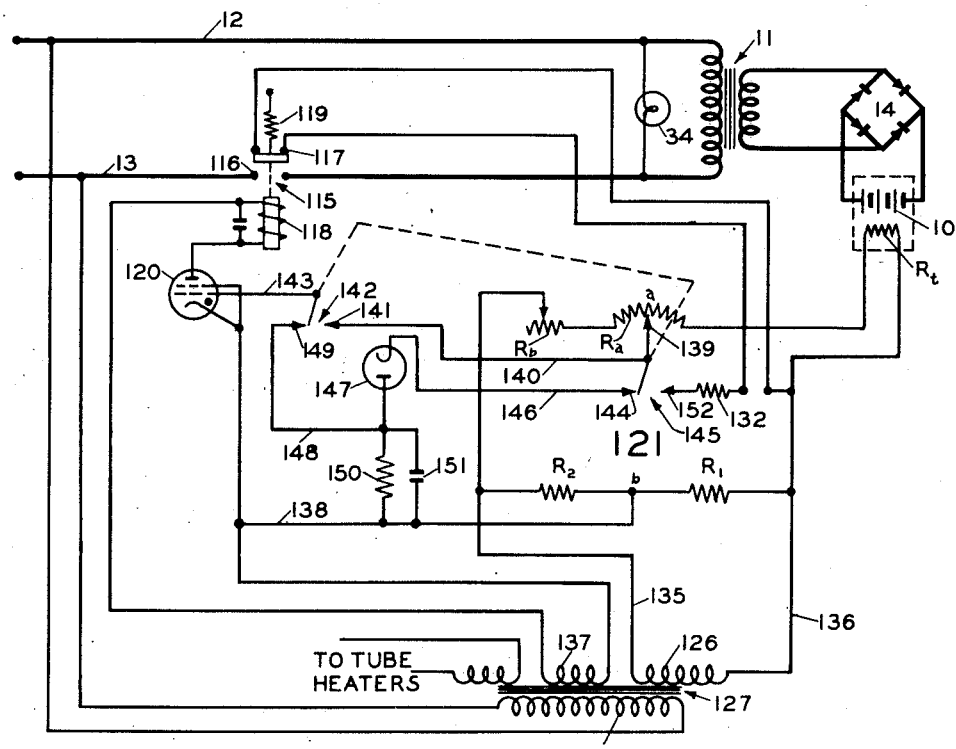
Fig. 10 is a schematic diagram of another form of manually adjustable charging apparatus constructed according to the invention.

Though the apparatus just described is advantageous for charging by the temperature rise method, we have found that in some instances the adjustment required to balance the bridge with the thermistor at the initial internal temperature of the battery to be charged is too fine, particularly where the operator is unskilled. In Fig. 10, we illustrate another form of apparatus which overcomes this difficulty.

In this embodiment, the charging circuit remains the same as that shown in Fig. 7, and a relay 115 is provided with contacts 116 in the charging circuit and contacts 117 in an unbalancing circuit hereinafter described. Relay 115 is normally biased to close contacts 117, as by spring 119, and is provided with energizing winding 118 in the plate circuit of thermionic tube 120, preferably a thyratron as previously described.

A temperature responsive bridge 121 comprises standard resistances $R_1$ and $R_2$, a negative temperature coefficient thermistor $R_t$ adapted to be inserted in the battery to be charged, and a resistance $R_b$. Between the arm containing resistance $R_b$ and the arm containing thermistor $R_t$ is adjustable resistance $R_a$, and it will be seen that, since the movable contact of resistance $R_a$ is the galvanometer point $a$ of the bridge, adjustment of $R_a$ increases one of the two arms just mentioned and simultaneously decreases the other, depending upon the direction of adjustment. Bridge 121 is supplied with alternating current by conductors 135 and 136 connected to secondary winding 126 of transformer 127, the primary winding 128 of this transformer being connected across the input of the charging circuit. A supplementary secondary winding 137 of transformer 127 is connected to the cathode and, through winding 118, the plate of tube 120.

The output of bridge 121 is connected across the grid and cathode of tube 120 through conductor 138 and either one of two circuits which will now be described. The first circuit comprises contact 139 of adjustable resistance $R_a$, conductor 140, one contact 141 of a single pole double throw snap switch 142, and conductor 143. The second circuit comprises contact 139, one contact 144 of a single pole double throw snap switch 145, conductor 146, diode rectifier 147, conductor 148, a second contact 149 of switch 142, and conductor 143. A time constant circuit between conductors 148 and 138 consists of resistance 150 and condenser 151.

An unbalancing resistance 132 is connected in parallel with thermistor $R_t$ only when contacts 117 of relay 115 are closed and switch 145 is actuated to engage contact 152.

Figure 11:
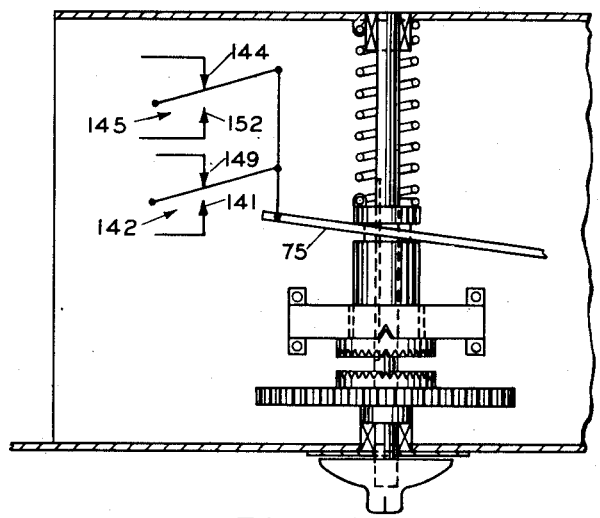
Fig. 11 is a fragmentary plan view of the adjusting mechanism shown in Fig. 8 combined with switch mechanism employed with the charging apparatus illustrated in Fig. 10.

The mechanism shown in Fig. 8 is employed to adjust resistance $R_a$ in the circuit just described. Further, switches 142 and 145 are jointly operated by movement of lever 75, as shown in Fig. 11. From Fig. 11 and Fig. 10, it will be seen that switches 142 and 145 act in one position to include rectifier 147 in the output circuit of the bridge 121. In the other position, switch 142 completes a direct connection between galvanometer point $a$ of bridge 121 and the grid of tube 120, while switch 145 connects resistance 132 to galvanometer point $a$ so that, upon closing of contacts 117, resistance 132 will be connected in parallel with thermistor $R_t$. When the adjusting mechanism of Fig. 8 is so manipulated that cam 69 seats in cam slot 73, switches 142 and 145 are actuated to the positions shown in Fig. 10, with rectifier 147 connected in the output circuit of the bridge.

Operation of this apparatus in carrying out charging by the temperature rise method is as follows: With thermistor $R_t$ inserted in the battery to be charged, the input leads of the charging circuit are connected to a suitable source of alternating current. Knob 63, Fig. 11, is adjusted to zero position so that cam 69 seats in cam slot 73, and switches 142 and 145 are in the positions shown in Fig. 10, diode rectifier 147 being thus included in the circuit, and resistance 132 being disconnected from the bridge.

With reference to Fig. 10, and to the description previously given of the operation of the thermionic tube employed, it will be seen that, so long as the output of bridge 121 is connected to tube 120 through rectifier 147 and its time constant circuit in the manner shown, tube 120 will be conductive only when bridge 121 is substantially balanced. As previously pointed out, tube 121 may become conductive upon occurrence of a grid potential of —1 volt with a plate potential of +110 volts. Rectifier 147, and its associated time constant circuit, are arranged as shown to convert any output voltage of bridge 121 to direct current voltage of a sense causing tube 120 to be non-conductive. Therefore, depending upon the particular tube chosen, tube 120 will be conductive only when bridge 121 is substantially balanced, so long as rectifier 147 is included in the circuit.

Thus, to perform the "start" adjustment of the circuit of Fig. 10, the operator need only turn knob 60, Fig. 8, until signal 34, Fig. 10, is energized. The "start" adjustment of knob 60 adjusts resistance $R_a$ until the bridge is substantially balanced and this condition, as just described, causes tube 120 to be conductive, winding 118 to be energized, and contacts 116 to be closed, completing the charging circuit and energizing signal 34. Since signal 34 is energized only when the bridge is substantially balanced, the operator's task of making the "start" adjustment is simplified. If, during the "start" adjustment, the operator turns knob 60 too far, signal 34 is deenergized, and the operator being thus notified need only reverse his adjustment until the signal is again energized.

Upon observing energization of signal 34, the operator leaves knob 60 in its adjusted position and makes the "run" adjustment by rotating knob 63 until the proper temperature rise is indicated on dial 64. As knob 63 is rotated sufficiently to cause cam 69 to ride out of cam slot 63, the resulting movement of lever 75 throws snap switches 142 and 145 to positions opposite to those shown in Fig. 10. This disconnects rectifier 147 and its associated time constant circuit from the bridge output circuit and substitutes therefor the conductive path consisting of contact 139, conductor 140, contact 141, and conductor 143.

Since rectifier 147 is no longer connected in the circuit, the grid voltage applied to tube 120 by bridge 121 will be an alternating current voltage, and tube 120 will therefore be conductive only when the phase of the grid voltage is positive or nearly positive with respect to the cathode. Adjustment of knob 63 to provide for the desired temperature rise is therefore an adjustment of resistance $R_a$ to unbalance the bridge 121 a predetermined amount in a direction causing the bridge output voltage to be positive with respect to the cathode. Tube 120 was made conductive when the "start" adjustment was made, and is maintained conductive by the "run" or temperature rise adjustment. Charging therefore proceeds until the desired temperature rise results in the battery, whereupon the bridge output voltage becomes sufficietly negative with respect to the cathode of tube 120 to make the tube non-conductive, winding 118 is deenergized, and spring 119 causes contacts 116 to be opened, breaking the charging circuit and so terminating charging.

As contacts 116 are opened, contacts 117 are closed. Since switch 145 engages contact 152, closing of contacts 117 connects resistance 132 in parallel with thermistor $R_t$. The value of resistance 132 is less than the value of thermistor $R_t$ at the highest temperature of the battery, and connection of resistance 132 into the bridge circuit therefore will maintain the charging circuit de-energized, even though thermistor $R_t$ might be allowed to cool. When the charger is to be again used to charge another battery, the return of knob 63, Fig. 11, to zero position, with cam 69 seated in cam slot 73, will actuate switch 145 to disconnect resistance 132 from the bridge circuit, so that the bridge can again be adjusted to energize the charging circuit.

Resistance $R_b$ is included in the arm of bridge 121 balancing the thermistor arm. Resistance $R_b$ is adjusted at the factory to a value such that no adjustment of resistance $R_a$ will unbalance the bridge to an extent requiring a temperature rise which would be dangerous to the battery being charged. Stated differently, the value of resistance $R_b$ is made sufficiently large so that no possible adjustment of resistance $R_a$ can unbalance the bridge to an extent which would require, for rebalancing, thermistor $R_t$ to be at a temperature exceeding a safe maximum for the battery, usually accepted as 125° F.

In Figs. 7 to 11, inclusive, we have shown apparatus which must be manually re-set after each battery-charging operation, that is to say, apparatus which may be described as "semi-automatic." We have, in addition, devised apparatus embodying the invention which is fully automatic, that is to say, apparatus which resets itself after each operation. With such apparatus, all the operator has to do is to actuate a push-button to initiate a charging operation.

Figure 12:
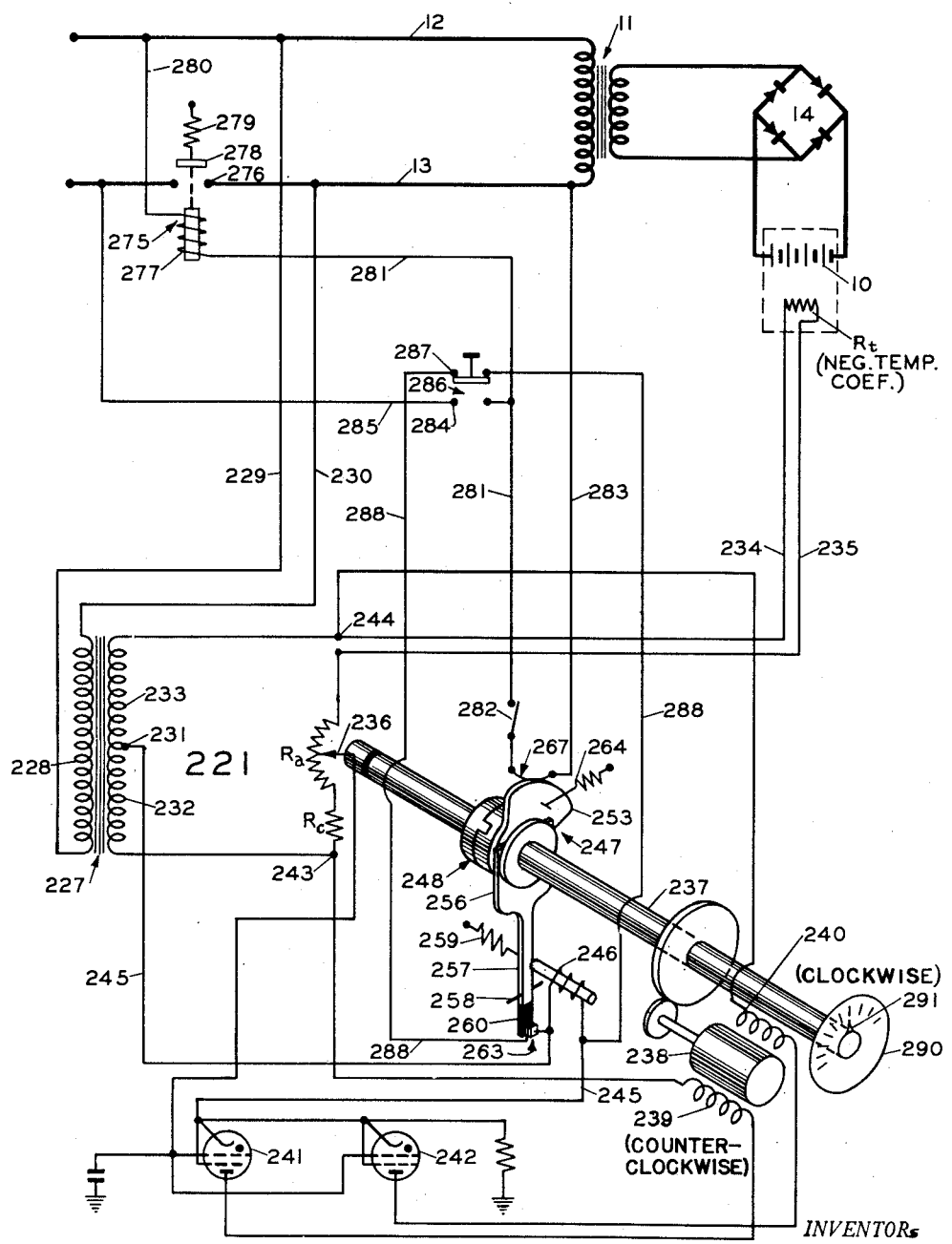
Fig. 12 is a schematic diagram of another form of battery charging apparatus constructed in accordance with the invention for charging batteries through a predetermined temperature rise without manual adjustment of the charging apparatus.

Such an embodiment of our invention is shown in Fig. 12, where the charging circuit is again the same as illustrated in Fig. 7. The circuit of this embodiment of the invention is applicable to either charging through a standard temperature rise, as will be first described, or to charging to an adjustable temperature rise.

Here, a bridge 221 is supplied with alternating current by a transformer 227, primary 228 of which is connected across the alternating current supply circuit of the charger by conductors 229 and 230. The secondary winding of transformer 227 is tapped at 231 to provide inductances 232 and 233, which are employed as the standard or ratio arms of the bridge 221. The temperature responsive arm of the bridge comprises negative temperature coefficient thermistor $R_t$, which as in the previous embodiment of the invention as constructed to be inserted into the battery 10 being charged and is connected into the bridge by conductors 234 and 235 of a conventional insulated electric cable. The arm balancing the thermistor arm of bridge 221 preferably includes a fixed resistance $R_c$. Connecting the two bridge arms just mentioned is a resistance $R_a$, and the dividing point between the two arms is determined by a movable contact 236 which is adjustable along resistance $R_a$ to determine the division of resistance $R_a$ between the two arms of the bridge. Thus, the two output or galvanometer points of the bridge 221 are at 231 and 236, and balance or unbalance of the bridge depends upon the resistance value of thermistor $R_t$, and therefore upon the temperature of $R_t$, and upon the position of contact 236.

The contact 236 is arranged to be adjusted along resistance $R_a$ by rotation of a shaft 237 driven by a reversible electric motor 238, preferably through high ratio gearing as shown.

Driving windings 239 and 240 of motor 238 are adapted to rotate the motor in clockwise and counterclockwise directions respectively, and are connected in the plate circuits of thermionic tubes 241 and 242, respectively, the plate circuit of tube 241 being conected at 243 to the side of bridge 221 nearest resistance Rc and the plate circuit of tube 242 being connected at 244 to the side bridge 221 nearest thermistor Rt. The cathodes of the two tubes are supplied by conductor 245 connected to the tap 231 between inductances 232 and 233, and it will be seen that conductor 245 normally includes the winding of a solenoid 246, the purpose of which will be hereinafter described. Thus, energization of either tube energizes the solenoid winding as long as that winding is not shunted from the cathode circuit. Tubes 241 and 242 are again preferably thyratrons. The grids of the two tubes are connected to output point 236 of bridge 221 as shown.

Located on shaft 237 is a cam switch unit 247 actuated by rotation of shaft 237 but capable of being rendered non-operative by a suitable clutch 248 controlled by solenoid 246. One embodiment of a suitable cam switch unit is shown in detail in Figs. 13 and 14.

Figures 13, 14:
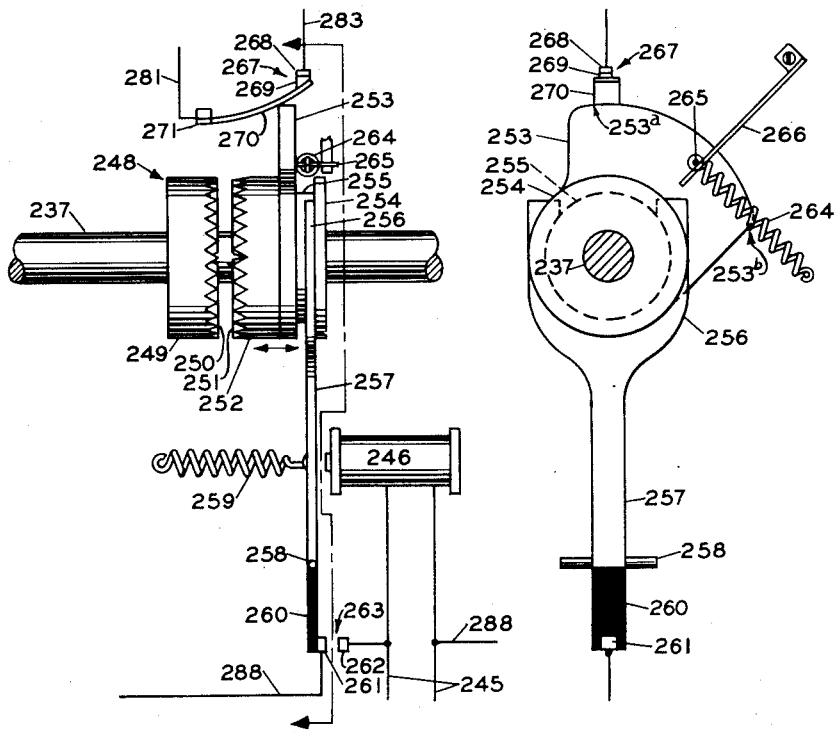
Fig. 13 is a fragmentary side elevation showing a preferred form of cam switch employed in the apparatus illustrated in Fig. 12, said cam switch being constructed to automatically determine the temperature rise through which the charging apparatus will charge a battery.
Fig. 14 is a vertical section taken on the line 14—14 of Fig. 13.

Referring to Fig. 13, there is fixed to the shaft 237 a clutch member 249, the clutch face 250 of which is engageable with clutch face 251 on a clutch member 252 slidable on shaft 237, members 249 and 252 making up clutch 248 shown diagrammatically in Fig. 12. Rigidly secured to member 252 is a cam 253. The slidable clutch member 252 is provided with an extension or collar 254 having an annular groove 255 provided to receive an operating yoke 256 in such a manner that movement of the yoke in one direction will cause clutch member 252 to slide along shaft 237 until clutch faces 251 and 250 are engaged, while movement of the yoke in the opposite direction will cause the clutch members to be disengaged as shown. Yoke 256 is provided with an extension lever 257 pivoted at 258 and normally biased by a tension spring 259 to move the yoke to cause the clutch 248 to be engaged. Lever 257 is of suitable magnetic material and solenoid 246, previously noted in Fig. 12, is arranged to cause lever 257 to move against the pull of spring 259 when the solenoid is energized. Thus, energization of solenoid 246 moves lever 257 about pivot 258 to disengage the clutch 248, and de-energization of the solenoid allows spring 259 to move the lever in the opposite direction, causing the clutch to engage, so that the clutch is therefore normally engaged, and electromagnetically disengaged.

Lever 257 is extended beyond pivot 258 to provide a switch arm 260 of insulating material. Arm 260 carries, on its side nearest solenoid 246, a contact 261 arranged to engage a stationary contact 262 when the clutch is engaged, and to be moved away therefrom when the solenoid is energized to disengage the clutch. Thus, arm 260, movable contact 261 and stationary contact 262 constitute a switch 263 which is open when clutch 248 is disengaged and closed when clutch 248 is engaged.

As best seen in Fig. 14, cam 253 is biased in a clockwise direction by tension spring 264. Whenever clutch 248 is disengaged, spring 264 will rotate member 252 relative to shaft 237 until pin 265 on the cam engages a suitable stop 266. Operated by cam 253 is a switch 267 comprising a stationary contact 268 and movable contact 269, the latter carried by a resilient arm 270.

Resilient contact arm 270 is secured at 271 to any suitable support, and normally occupies a horizontal position in the path of cam 253, in which position switch 267 is open. But, when cam 253 is rotated clockwise by spring 264, whenever clutch 248 is disengaged, movable contact arm 270 is displaced upwardly by the cam surface, and switch 267 closes. Switch 267 remains closed until counter-clockwise rotation of shaft 237, with clutch 248 engaged, causes the cam 253 to travel beyond the switch. With reference to operation of switch 267, the cam surface of cam 253 has an effective length from point 253ª, determined by positions of pin 265 and stop 266, to low point 253ᵇ. Whenever solenoid 246 is energized to disengage clutch 248, cam 253 is rotated to the position shown in Fig. 14, such rotation causing the cam to close switch 267. The time period during which switch 267 is maintained closed is determined by the effective length of the cam surface and the speed of counter-clockwise rotation of shaft 237.

Referring again to Fig. 12, it will be seen that a normally open relay 275 is provided with contacts 276 in supply lead 13 of the charging circuit, relay 275 including an actuating winding 277 and a contact closing member 278 normally held in open position by a spring 279. One terminal of winding 277 is connected by conductor 280 to charger supply lead 12, the other terminal of the winding being connected by conductor 281 through switch 282 to the movable contact of switch 267. Switch 282 is a limit switch opened automatically in the event that rotation of shaft 237 is such as to move contact 236 of resistance Ra to the end of that resistance on the side nearest resistance Rc. From the stationary contact of switch 267, the circuit of winding 277 is connected by conductor 283 to charger supply lead 13 at some suitable point between contacts 276 and transformer 11. Also, switches 267 and 282 can be shunted from the circuit of winding 277 by closing contacts 284 in conductor 285 which completes the circuit of winding 277 to power lead 13 of the charging circuit.

Contacts 284 form one contact set of a two-position push-button switch 286. Switch 286 is biased to normally open contacts 284 and close a second set of contacts 287 in a conductor 288, conductor 288 also including contacts 261 and 262 of switch 263 previously discussed and shown in detail in Fig. 13. When switch 286 is in its normal position, closing contacts 287, and clutch 248 is engaged so that switch 263 is closed, conductor 288 short circuits solenoid 246 from the cathode supply of tubes 241 and 242.

From Fig. 12 it will be seen that counter-clockwise rotation of shaft 237 by motor 238 adjusts contact 236 to increase the portion of resistance Ra in the thermistor arm of bridge 221, correspondingly decreasing the portion of resistance Ra in the arm of the bridge comprising Rc. Counter-clockwise rotation of the motor results when tube 242 is conductive, energizing motor winding 240, while tube 241 is non-conductive. When tube 241 is conductive and tube 242 non-conductive, winding 239 will be energized to rotate the motor clockwise.

Operation of this embodiment of the invention is as follows: Charger supply leads 12 and 13 are connected to a suitable source of alternating current, and thermistor Rt is inserted in the battery 10 to be charged. After thermistor Rt has had time to assume the initial internal temperature of the battery, push-button switch 286 is momentarily depressed to open contacts 287 and close contacts 284. Closing of contacts 284 completes the circuit of winding 277 of relay 275, through conductors 280, 281 and 285, thus energizing the relay to close contacts 276, completing the charging circuit and also supplying current to bridge 221. The charging circuit is then maintained completed as hereinafter described. While push button switch 286 is depressed to open contacts 287, solenoid 246 is in the cathode supply circuit of tubes 241 and 242.

With negative temperature coefficient thermistor $R_t$ at the initial relatively low temperature of the batery, and therefore at a relatively high resistance value, bridge 221 will be unbalanced, most likely in a sense resulting from excessive resistance in the thermistor arm of the bridge. This initial unbalance of bridge 221 causes a bridge output potential capable of firing one of the two tubes 241 and 242, so energizing one of the windings of motor 238. Regardless of which tube is fired, and therefore regardless of the direction of rotation of the motor, solenoid 246 is connected in the cathode supply circuit, since contacts 287 are open, and the solenoid will therefore be energized to disengage clutch 248 upon firing of either tube, and the clutch will be maintained disengaged until the tube again becomes non-conductive. Energization of solenoid 246 also opens contacts 261 and 262 of switch 263, thereby allowing push-button switch 286 to be released immediately after its momentary depression.

As soon as clutch 248 is disengaged by energization of the solenoid, spring 264 rotates clutch member 252 and its associated cam 253 in a clockwise direction until pin 265 engages stop 266. When cam 253 is in the position determined by stop 266, switch 267 is closed, thus completing a circuit from winding 277 of relay 275 to supply lead 13 of the charger through conductor 281, switch 282, which will be closed at this point in operation of the device, switch 267 and conductor 283. Energization of relay 275 to maintain contacts 276 closed is thus assured until such time as cam 253 allows switch 267 to open.

If, as is most likely, bridge 221 is initially unbalanced by excessive resistance in the thermistor arm of the bridge, output of the bridge will be such as to cause tube 241 to become conductive, as will be clear from the discussion of operation of the bridge and tube earlier herein with reference to Fig. 7. Tube 241 being conductive, motor winding 239 is energized to rotate motor 238 in a counter-clockwise direction until balance of the bridge 221 is restored by the resulting clockwise adjustment of contact 236, along resistance $R_a$. When the bridge is rebalanced, tube 241 will again become non-conductive, and solenoid 246 will therefore be de-energized, allowing clutch 248 to be engaged by reason of the tension of spring 259. Balancing of the bridge by the initial controlling action of tube 241 takes place quickly after actuation of push-button switch 286, and for all practical purposes this balancing action occurs with the thermistor at the initial internal temperature of the batery.

Since contacts 276 of relay 275 are maintained closed as above described, charging proceeds, and the internal temperature of the battery therefore begins to rise. As the internal temperature of the battery rises during charging, the resistance of thermistor $R_t$ correspondingly decreases, and bridge 221 is therefore unbalanced by the decreasing resistance in the thermistor arm of the bridge. When this unbalance has increased to an amount determined by the character of tube 242 and its shield grid bias, tube 242 becomes conductive, energizing winding 240 of motor 238 and so causing the motor to rotate shaft 237 in a counter-clockwise direction until counter-clockwise movement of contact 236 along resistance $R_a$ rebalances the bridge, whereupon tube 242 becomes non-conductive.

As the temperature of the battery continues to rise, the resistance of $R_t$ progressively decreases until the bridge is again unbalanced and the tube 242 again becomes conductive, whereupon the motor is again energized to move the contact 236 further in the same direction, until the bridge is rebalanced, and the tube again becomes non-conductive. Thus the cam 253 is rotated step-by-step, as the battery temperature rises. Since release of push-button switch 286, and the closing of switch 263 when solenoid 246 was de-energized upon completion of the initial balancing of the bridge, short-circuited solenoid 246 from the cathode supply circuit, clutch 248 remains continuously engaged during progress of the charge. Therefore, rotation of shaft 237 also rotates cam 253. Release of push-button switch 286 also opened contacts 284, thereby making energization of winding 277 of relay 275 dependent upon switches 267 and 282 being closed.

So long as switches 267 and 282 remain closed, the charge proceeds, bridge 221 being successively unbalanced by the effect of the rising internal temperature of the battery, and rebalanced by the follow-up action of the thyratron controlled motor. Each successive rebalancing step results in an incremental counter-clockwise rotation of cam 253, with the cam surface maintaining the switch closed, until the charge has progressed to such an extent that point 253$^b$ of cam 253 is rotated beyond the movable arm of switch 267, and the switch springs open, breaking the circuit of winding 277 of relay 275. Contacts 276 are thereupon opened by action of spring 279, and the flow of current in the charging circuit is thus interrupted.

Characteristics of the elements of bridge 221 may be either constant or compensated, and the amount of unbalance of the bridge during progress of charging, and therefore, the amount of counter-clockwise rotation of shaft 237 vary directly as the rise of internal temperature of the battery during charging. It will be understood that thermally variable resistors now generally available to the trade do not exhibit a linear resistance variation with changing temperatures. In order that the amount of counter-clockwise rotation of shaft 237 allowed by cam 253 shall correspond to a single temperature rise, regardless of the initial battery temperature sensed by thermistor $R_t$, the resistance $R_a$ is made non-linear to correspond to the non-linearity of the thermistor.

The effective length of the cam surface of cam 253, as previously defined, determines the amount of counter-clockwise rotation of shaft 237 necessary to open switch 267 to terminate charging. Therefore, the effective length of the cam surface determines the temperature rise which will occur during charging by the apparatus. It is obvious that a particular cam may be designed to give a charging duration of 35° F. temperature rise, or 45° F., or any other desired value. In the preferred form of the invention, when employed according to the embodiment of Fig. 10, the length of the cam surface is chosen to terminate the charge at the end of a 45° F. temperature rise. By reference to Fig. 1, it will be seen that choice of this value takes advantage of the fact that the temperature rise versus increase in state of charge curve climbs abruptly during the first 35–50° F. of temperature rise, and thereafter tapers off rapidly. As previously pointed out, an average automotive storage battery, when charged through a temperature rise of 35–50° F., will be from 70% to 100% charged at the end of the temperature rise, and the lower limit of 70% full charge is adequate for automotive battery charging work. Therefore, when a charging apparatus constructed according to Fig. 12, with a cam designed to give a charging period of approximately 35–50° F. temperature rise, is employed to charge automotive storage batteries, there is no need to make preliminary tests of the battery to be charged, and there are no manual adjustments of the charger to be made. All that is necessary is that the apparatus be properly connected and that switch 286 be momentarily depressed to initate charging.

The progressive adjustment of $R_a$ during charging corresponds closely to the rising internal temperature of the battery. Therefore we prefer to employ at some convenient point on the charger casing a suitable indicator calibrated in terms of battery temperature, this indicator being adjusted in any suitable manner by rotation of the shaft 237 which adjusts resistance $R_a$. Such indicator may be of the dial and pointer type with the pointer either carried directly by shaft 237 or driven by shaft 237 through any conventional mechanism desired. In Fig. 12, we have shown such an indicator as comprising a dial 290 mounted on the casing of the apparatus, not shown and being free from shaft 237, and a pointer 291 secured to and rotated by shaft 237. Since $R_a$ is preferably a non-linear resistance, corresponding to the non-linearity of the thermistor $R_t$, a given position of the shaft 237 will always be indicative of a particular temperature of the thermistor, and the dial 290 can be calibrated accordingly.

While we have described certain apparatus for carrying out the invention which is wholly manual, other apparatus which is manually adjusted but semi-automatic in its operation, and still other apparatus which is fully automatic, they all embody the same fundamental concept, namely terminating the charging of a battery after its internal temperature has traversed a predetermined rise above its initial value, regardless of what this initial value was, or what the final temperature may be. This is an entirely different concept from that of terminating charging upon the attainment of a predetermined maximum temperature, as has heretofore been proposed.

It should be understood that, while we have discussed only lead-acid storage batteries, the present invention is of course applicable to the charging of other types of storage batteries.

Where, in this specification and the appended claims, we refer to the charging circuit of a battery charging apparatus, we mean the main power circuit of the apparatus as distinguished from the subsidiary control, testing and like circuits. Thus, a charging circuit within the meaning of this term may comprise either a simple circuit for delivering the output of a direct current generator to a battery, or may comprise the combination of an alternating current supply, a transformer, a rectifier, and the rectifier output circuit, as is now common practice in the fast charging art.

Reference is made to Patent 2,499,663, issued March 7, 1950, to Lewis A. Medlar, which patent describes and claims safety devices which may, if desired, be incorporated in the devices shown in Figs. 7, 10 and 12 of the present application. Such safety devices serve to prevent the charging circuit from being energized if the operator neglects to insert the thermally responsive element $R_t$ in the battery being charged.

We claim:

1. The method of charging a storage battery, comprising subjecting the battery to charging at a power level of sufficient magnitude that heat lost from the battery during charging is negligible when compared with heat generated in the battery as a result of charging, and terminating charging when the internal temperature of said battery has traversed a selected rise above its initial value at the beginning of charging, regardless of the value of the initial temperature.

2. The method of fast charging a storage battery, comprising charging said battery at so high a rate that heat lost from said battery during charging is negligible when compared with the heat generated in said battery during charging, detecting the internal temperature of the battery at the start of charging, continuously detecting the increase in the internal temperature of the battery during charging, and terminating charging when said internal temperature has traversed a selected rise above its initial value at the start of charging, regardless of the value of the initial temperature.

3. The method of charging a storage battery, comprising determining the initial state of charge of the battery, subjecting the battery to charging at a power level of sufficient magnitude so that heat lost from the battery during charging is negligible when compared with heat generated in the battery as a result of charging, and terminating charging when the internal temperature of the battery has traversed a selected rise above its initial value at the beginning of charging, said selected rise being based upon said initial state of charge, said power level, and the percentage of charge desired.

4. The method of charging a storage battery, comprising determining the initial state of charge of the battery, subjecting the battery to charging at a predetermined power level of sufficient magnitude so that heat lost from the battery during charging is negligible when compared with heat generated in the battery as a result of charging, determining the initial internal temperature of the battery and thereafter continuously detecting the progressive increase of the internal temperature of the battery resulting from charging, and terminating charging when the internal temperature of the battery has increased above its initial value at the beginning of charging by a selected amount determined jointly by said initial state of charge, said power level, and the percentage of charge desired, regardless of the value of the initial temperature.

5. The method of increasing the state of charge of a partially discharged storage battery to at least 70% of full charge, comprising charging said battery at such a high rate that heat lost from the battery during charging is negligible when compared with the heat generated during charging, and terminating charging at the completion of a selected rise in said internal temperature of at least 35° F. above its initial value at the beginning of charging, regardless of the value of the initial temperature.

6. The method of increasing the state of charge of a partially discharged storage battery to at least 70% of full charge, comprising fast charging the battery at a predetermined power level of from 100 to 1100 watts, and terminating charging at the completion of a selected rise in the internal temperature of the battery above its initial value at the beginning of charging, the extent of said selected rise being in the range of 35–60° F., depending upon the power level of charging, regardless of the value of the initial temperature.

7. The method of increasing the state of charge of a partially discharged storage battery to at least 70% of full charge, comprising subjecting said battery to charging at a power level of sufficient magnitude so that heat lost from said battery is negligible when compared with heat generated as a result of charging, continuously detecting the increase in internal temperature of the battery during charging, and terminating charging when the internal temperature of the battery has increased above its initial value at the beginning of charging by a selected amount between 35 and 60° F., dependent upon the power level selected, regardless of the value of the initial temperature.

8. The method of increasing the state of charge of a partially discharged storage battery to at least 70% of full charge, comprising subjecting any battery, without test, to charging at such a high rate that heat lost from the battery during charging is negligible as compared with the heat generated by charging, and terminating charging after the battery has traversed a standard temperature rise above its initial value at the beginning of charging, which rise is the same for all batteries regardless of initial state of charge and initial temperature.

9. The method of increasing to at least 70% of full charge the state of charge of an automotive storage battery discharged to the extent where it will not operate the starting motor of an automobile when the engine is cold, comprising fast charging such battery at a power level of sufficient magnitude that heat lost from the battery is negligible when compared with heat generated in the battery as a result of charging, and terminating charging when the internal temperature of the battery has increased by a selected amount within the range of 35–60° F. as a result of charging, regardless of the value of the initial internal temperature of the battery.

10. In a battery charging apparatus, the combination of a charging circuit for supplying current to a battery, thermally responsive means constructed to be continuously subjected to the internal temperature of the battery, and means controlled by said thermally responsive means for automatically interrupting said charging circuit when the internal temperature of the battery has traversed a predetermined rise above its initial value at the beginning of charging, regardless of the value of the initial temperature.

11. In a battery charging apparatus, the combination with means for supplying charging current to a battery, thermally responsive means for continuously detecting the internal temperature of the battery, and means controlled by said thermally responsive means for automatically interrupting the supply of current to the battery when its internal temperature has risen to a predetermined extent above its initial value at the beginning of charging, regardless of the value of the initial temperature.

12. In a battery charging apparatus, the combination of means for supplying charging current to a battery, thermally responsive means for continuously detecting the internal temperature of the battery, means controlled by said thermally responsive means for automatically interrupting the supply of current to the battery when its internal temperature has risen to a predetermined extent above its initial value at the beginning of charging, regardless of the magnitude of said initial value, and means for selecting a particular extent of rise above the initial temperature at the end of which it is desired to have the current supply interrupted.

13. In a battery charging apparatus, the combination of means for supplying charging current to a battery, thermally responsive means for continuously detecting the internal temperature of the battery, means controlled by said thermally responsive means for automatically interrupting the supply of current to the battery when its internal temperature has risen to a predetermined extent above its initial value at the beginning of charging, regardless of the magnitude of said initial value, and means for manually adjusting the extent of the temperature rise which the battery must traverse in order to automatically interrupt the current supply.

14. In a battery charging apparatus, the combination of a charging circuit for supplying charging current to a battery, a circuit interrupter having contacts in said charging circuit, thermally responsive means constructed to be inserted in the battery to be charged, and means controlled by said thermally responsive means for maintaining said contacts closed only until the internal temperature of the battery being charged has advanced a predetermined amount over its initial value at the start of charging regardless of the value of the initial temperature.

15. In a battery charging apparatus, a charging circuit for supplying charging current to a battery, a relay having contacts in said charging circuit, thermally responsive means constructed to be inserted in the battery to be charged, and relay actuating means controlled by said thermally responsive means and constructed to cause said relay to close said contacts, completing said charging circuit, only while the temperature of said thermally responsive means is within a definite range, said relay actuating means including means for establishing the initial temperature of the battery at the start of charging as the lower limit of said range, regardless of the value of such initial temperature.

16. In a battery charging apparatus, the combination of a charging circuit for supplying charging current to a battery, a relay having contacts in said charging circuit, thermally responsive means constructed to be inserted in the battery to be charged, adjustable relay actuating means controlled by said thermally responsive means and constructed to cause said relay to close said contacts, completing said charging circuit, only while the temperature of the battery being charged, as detected by said thermally responsive means, is within a selected range determined by adjustment of said relay actuating means, and means for adjusting said relay actuating means to establish the initial temperature of the battery at the start of charging as the lower limit of said range, regardless of the value of such initial temperature.

17. In a battery charging apparatus, the combination of a charging circuit for supplying charging current to a battery, a relay having contacts in said charging circuit, thermally responsive means constructed to be inserted in the battery to be charged, relay actuating means controlled by said thermally responsive means and constructed to cause said relay to close said contacts, completing said charging circuit, only while the temperature of the battery being charged, as detected by said thermally responsive means, is within a selected range, means for establishing the initial temperature of the battery at the start of charging as the lower limit of said range, and a resettable control element in said relay actuating means for determining the extent of said range.

18. In a battery charging apparatus, a charging circuit for supplying charging current to a battery; a circuit interrupter for making and breaking said charging circuit; a balanceable network including a thermally responsive impedance adapted to be subjected to the internal temperature of the battery to be charged; adjusting means for balancing said network when the internal temperature of the battery is at its initial value and for thereafter unbalancing said network to a definite extent in a given sense; means responsive to such unbalancing for causing said circuit interrupter to complete said charging circuit for so long as said network is thus unbalanced, said thermally responsive impedance serving to rebalance said network and thus cause said circuit interrupter to open upon completion of a rise in the internal temperature of the battery being charged, which rise is predetermined by the extent of unbalance of said network, and means for indicating when said network is balanced.

19. In a battery charging apparatus, a charging circuit for supplying current to a battery; a balanceable network including a thermally responsive impedance adapted to be subjected to the internal temperature of the battery to be charged; manually operated adjusting means for balancing said network when the internal temperature of the battery is at its initial value; separate, manually operated adjusting means for unbalancing said network to a definite extent in a given sense, and means responsive to such unbalancing for causing said charging circuit to be closed, and to remain closed so long as said network is thus unbalanced, said thermally responsive impedance serving to rebalance said network and open said charging circuit upon the completion of a predetermined rise in the temperature of the battery being charged.

20. Apparatus according to claim 19, in which means are provided for indicating when said network has been balanced by said manually operated adjusting means.

21. In a battery charging apparatus, a charging circuit for supplying charging current to a battery; a balanceable network including a thermally variable impedance adapted to be subjected to the internal temperature of the battery to be charged, and an adjustable impedance by which the balance of said network can be controlled; means responsive to unbalance of said network in a given sense for causing said charging circuit to be completed and to remain completed so long as said network is unbalanced; manually operated means for adjusting said adjustable impedance to balance said network when said thermally variable impedance is at the initial internal temperature of the battery to be charged; and a second manually operated means for further adjusting said adjustable impedance to unbalance said network to a definite extent in said given sense, said thermally variable impedance serving to compensate for such unbalance and to rebalance the network and open said circuit in response to a predetermined rise in the temperature of the battery being charged.

22. The apparatus of claim 21, in which means are provided for preventing operation of said second manually operated means until said network has been balanced by said first manually operated means.

23. In a battery charging apparatus, a charging circuit for supplying charging current to a battery; a balanceable network including a thermally variable impedance adapted to be subjected to the internal temperature of the battery to be charged, and an adjustable impedance by which the balance of said network can be controlled; means responsive to unbalance of said network in a given sense for causing said circuit to be closed so long as said network is unbalanced; a rotatable shaft by means of which said adjustable impedance can be adjusted, manually operated means, including a normally engaged clutch, for rotating said shaft to balance said network when said thermally variable impedance is at the initial internal temperature of the battery to be charged; a second manually operated means for rotating said shaft to unbalance said network to a definite extent in said given sense, said second manually operated means including a normally disengaged clutch, and means automatically actuated by the initial movement of said first mentioned manually operated means to simultaneously disengage said first mentioned clutch and engage said second mentioned clutch, said thermally variable impedance serving to rebalance said network and open said charging circuit upon the completion of a predetermined rise in the temperature of the battery being charged.

24. In a battery charging apparatus, a charging circuit for supplying current to a battery; a Wheatstone bridge including in one arm a thermally variable impedance having a given temperature coefficient, said thermally variable impedance being adapted for insertion in the battery to be charged; means responsive to the output of said bridge for completing said charging circuit only when said bridge is unbalanced in a sense caused by a relatively low temperature of said thermally responsive impedance and for interrupting said charging circuit whenever said bridge is substantially balanced; an adjustable impedance by which the balance of said bridge can be controlled; a first manually controlled means for adjusting said adjustable impedance to balance said bridge when said thermally variable impedance is at the initial internal temperature of a battery to be charged, and second manually controlled means for adjusting said adjustable impedance to unbalance said bridge in a sense to be recovered by a rising temperature of said thermally variable impedance.

25. In a battery charging apparatus, the combination of a charging circuit for supplying charging current to a battery, a relay having contacts in said charging circuit, thermally responsive means constructed to be inserted in the battery to be charged, adjustable relay actuating means controlled by said thermally responsive means and constructed to cause said relay to close said contacts, completing said charging circuit, only while the temperature of the battery being charged, as detected by said thermally responsive means, is within a selected range, means for adjusting said relay actuating means to establish the initial temperature of the battery at the start of charging as the lower limit of said range, regardless of the value of such initial temperature, and means for preventing said relay actuating means from causing said relay to complete said charging circuit until said relay actuating means has been so adjusted.

26. In a battery charging apparatus, a charging circuit for supplying charging current to a battery, a relay having contacts in said charging circuit, a balanceable network including a thermally responsive impedance adapted to be subjected to the internal temperature of the battery to be charged, a relay actuating circuit normally arranged to cause said relay to complete said charging circuit only while said balanceable network is unbalanced in a definite sense to be recovered by increase in temperature of said thermally responsive impedance, adjusting means for first balancing said network when said impedance is at the initial temperature of the battery and thereafter unbalancing said network a definite extent in said given sense, and means preventing said relay actuating circuit from causing said relay to complete said charging circuit, regardless of the initial sense of unbalance of said network, until said network has first been balanced by said adjusting means.

27. In a battery charging apparatus, a charging circuit for supplying current to a battery; a balanceable network including a thermally responsive impedance of a given temperature coefficient, said impedance being adapted to be inserted in the battery to be charged; an actuating circuit connected to the output terminals of said network and normally arranged to complete said charging circuit in response only to unbalance of said network in a sense caused by a relatively low temperature of said thermally responsive impedance and to interrupt said charging circuit whenever said network is substantially balanced; means for converting said actuating circuit to operation in response only to magnitude of unbalance of said network; manually operated means for selectively connecting said means in said actuating circuit and disconnecting said means from said actuating circuit, and manually operated means for adjusting the balance point of said network.

28. In a battery charging apparatus, a charging circuit for supplying charging current to a battery to be charged; a Wheatstone bridge including in one arm a thermally responsive impedance adapted to be subjected to the internal temperature of the battery being charged; an alternating current supply circuit for said bridge; a thermionic tube including a cathode, a control grid and a plate, said cathode being connected to one of the galvanometer points of said bridge; two circuits for connecting the grid to the other galvanometer point of said bridge, one of said two circuits including means for converting the current flowing between said galvanometer points to unidirectional current of a predetermined direction; means for selective connection of either of said two circuits to said grid; a contactor in said charging circuit normally biased to open position; means connected to the plate of said tube for closing and maintaining closed said contactor only when said tube is conductive; and manually operable means for adjusting the balance point of said bridge.

29. In a battery charging apparatus, a charging circuit for supplying charging current to a battery to be charged; a Wheatstone bridge including in one arm a thermally responsive impedance adapted to be subjected to the internal temperature of the battery being charged; an alternating current supply circuit for said bridge; a thermionic tube including a cathode, a control grid and a plate, said cathode being connected to one of the galvanometer points of said bridge; two circuits for connecting the grid to the other galvanometer point of said bridge, one of said two circuits including means for converting the current flowing between said galvanometer points to unidirectional current of a predetermined direction; a contactor in said charging circuit normally biased to open position; means connected in the plate circuit of said tube for closing and maintaining said contactor closed only when said tube is conductive; switching means capable of selective connection of either of said two circuits to said grid; an adjustable impedance in said bridge by means of which the balance point of said bridge can be adjusted, and a single manually operated means for adjusting said resistance and actuating said switching means.

30. In a battery charging apparatus, a charging circuit for supplying current to a battery; a balanceable network controlled by a thermally responsive impedance adapted to be inserted in the battery to be charged; manually adjustable means for controlling the balance of said network; a relay arranged to make and break said charging circuit; a relay actuating circuit controlled by the output of said network and normally arranged to cause said relay to complete said charging circuit only in response to unbalance of said network in a sense caused by a relatively low temperature of said thermally responsive impedance and to cause said relay to break said charging circuit whenever said network is substantially balanced; means for converting said relay actuating circuit to operation such as to cause said relay to be closed only in response to magnitude of unbalance of said network in any sense; manually operated means for activating and deactivating said last means, and signal means for indicating when said charging circuit is complete.

31. In a battery charging apparatus, the combination of a charging circuit for supplying charging current to a battery, a contactor in said charging circuit, thermally responsive means for continuously detecting the internal temperature of the battery, actuating means controlled by said thermally responsive means for maintaining said contactor closed to complete said charging circuit only while the temperature of the battery, as detected by said thermally responsive means, is within a selected range, said actuating means including means for establishing the initial temperature of the battery at the start of charging as the lower limit of said range, regardless of the value of such initial temperature, a manually operated switch for initiating the supply of current to the battery by said charging circuit, and means automatically resettable upon closing of said switch for determining the extent of said range.

32. In a battery charging apparatus, the combination with means for supplying charging current to a battery, of thermally responsive means constructed to be inserted in the battery to be charged, means controlled by said thermally responsive means for automatically interrupting the supply of current to the battery when its internal temperature has traversed a predetermined rise, a manual switch for causing the charging cycle to be repeated, and means set in operation by the momentary closing of said switch for both restoring the charging apparatus to its original condition in which the same temperature rise is reset and initiating another similar charging cycle.

33. In a battery charging apparatus, a charging circuit for supplying charging current to a battery, a thermally responsive element constructed to be inserted in the battery to be charged; a relay arranged to complete said charging circuit when closed and to interrupt said charging circuit when open; cyclically operable control means under influence of said thermally responsive element, each cycle of operation of said control means causing said relay to be closed only while the temperature of said thermally responsive element traverses a predetermined increase of fixed value, and means responsive to actuation of a single manually operated switch for initiating operation of said control means, said control means being automatically deactivated upon completion of one cycle of operation pending reactuation of said switch.

34. In a battery charging apparatus, a charging circuit for supplying current to a battery; a circuit interrupter arranged to complete said charging circuit when closed and to break said charging circuit when open; a thermally responsive impedance constructed to be inserted in the battery to be charged and capable of being continuously varied by the internal temperature of the battery as said temperature rises during charging; a balanceable network under influence of said thermally responsive impedance, increase in temperature of said impedance causing said network to be unbalanced in one sense; means for causing a first balancing of said network when said temperature responsive impedance has assumed the initial internal temperature of the battery being charged; automatic means constructed to thereafter rebalance said network to recover the unbalance of said network caused by the effect on said temperature responsive impedance of the rising internal temperature of the battery being charged, and means for causing said circuit interrupter to be closed in response to operation of said first balancing means and to be maintained closed only until completion of a predetermined amount of adjustment of said network by said rebalancing means.

35. In a battery charging apparatus, a charging circuit for supplying current to a battery; a balanceable network, said network including a thermally responsive impedance adapted to be inserted in the battery to be charged, whereby said network is progressively unbalanced in one sense as the temperature of the battery rises during charging; a variable impedance in said network arranged to balance said thermally responsive impedance; automatic means for adjusting said variable impedance in either direction; means for activating said automatic means to adjust said variable impedance to balance said network when said thermally responsive element is at the initial temperature of the battery to be charged and to thereafter periodically adjust said variable impedance to periodically recover unbalance of said network caused by rising internal temperature of said battery during charging; and single means for completing said charging circuit when said network is first balanced and interrupting said charging circuit when said adjusting means has adjusted said variable impedance to a predetermined extent in a sense recovering unbalance of said network caused by rising temperature of said battery during charging.

36. In a battery charging apparatus, a charging circuit for supplying current to a battery; a relay arranged when de-energized to break said charging circuit and when energized to complete said charging circuit; a thermally responsive impedance constructed to be inserted in the battery to be charged and capable of continuously detecting the internal temperature of the battery as said temperature rises during charging; a balanceable network under influence of said thermally responsive impedance, increase in temperature of said impedance causing said network to be unbalanced in one sense; an adjustable impedance in said network, unbalance of said network caused by changes in temperature of said thermally responsive impedance being recoverable by adjustment of said adjustable impedance; a reversible motor arranged to adjust said adjustable impedance in either direction; manually controlled means operable to cause said motor to adjust said adjustable impedance to balance said network when said impedance is at the initial internal temperature of the battery; means whereby said motor is automatically caused to adjust said adjustable impedance to rebalance said network as the temperature of said thermally responsive impedance rises during charging, and single means for causing said relay to be energized upon initial balancing of said network and de-energized only after said motor has adjusted said impedance a predetermined amount during rebalancing of said network as the temperature of said thermally responsive impedance rises during charging.

37. In a battery charging apparatus, a charging circuit for supplying current to a battery; a relay arranged when de-energized to break said charging circuit and when energized to complete said charging circuit; a thermally responsive impedance constructed to be inserted in the battery to be charged and capable of continuously detecting the internal temperature of the battery as said temperature rises during charging; a balanceable network under influence of said thermally responsive impedance, increase in temperature of said impedance causing said network to be unbalanced in one sense; an adjustable impedance in said network, unbalance of said network caused by changes in temperature of said thermally responsive impedance being recoverable by adjustment of said adjustable impedance; a reversible motor arranged to adjust said adjustable impedance in either direction; a first circuit energized only in response to unbalance of said network in said one sense to drive said motor in a direction such as to adjust said adjustable impedance in a direction to rebalance said network; a second circuit energized only in response to unbalance of said network in a sense opposite to said one sense to drive said motor in the opposite direction, said first and second circuits being de-energized whenever said network is substantially balanced; an actuating circuit arranged when completed to energize said relay; a normally open switch in said actuating circuit, and switch closing means operable to close said switch only in response to energization of either said first circuit or said second circuit to balance said network when said thermally responsive impedance is at the initial internal temperature of the battery being charged, said switch closing means being constructed to thereafter maintain said switch closed until said motor has rotated a predetermined amount in a direction to recover unbalance of said network caused by effect on said thermally responsive impedance of the increasing internal temperature of the battery during charging.

38. In a battery charging apparatus, a charging circuit for supplying charging current to a battery; a relay arranged to complete said charging circuit when closed and to interrupt said charging circuit when open; a balanceable network including a thermally responsive impedance constructed to be inserted in the battery to be charged, whereby rising temperature of the battery during charging causes said network to be unbalanced in one sense; an adjustable impedance in said network for controlling the balance thereof; a rotary shaft for adjusting said adjustable impedance; a reversible motor for rotating said shaft in either direction; manually activated means for actuating said motor to balance said network when said thermally responsive impedance is at the initial internal temperature of the battery being charged; automatic means responsive only to unbalance of said network in said one sense for actuating said motor to rebalance said network periodically as the temperature of the battery rises during charging; an actuating circuit arranged when completed to maintain said relay closed; a normally open switch in said actuating circuit; a cam carried by said shaft for actuating said switch; a clutch for selectively clutching said cam to and declutching said cam from said shaft, said cam being arranged for rotation by said shaft from an initial position in which said switch is closed to a final position at which said switch is opened, when said clutch is engaged and said shaft rotated in a direction adjusting said adjustable impedance to recover unbalance of said network caused by rising temperature of the battery being charged; means for automatically returning said cam to its initial position whenever said clutch is disengaged, and automatic means whereby said clutch is disengaged while said motor is being actuated by said manually activated means when said thermally responsive impedance is at the initial temperature of the battery.

39. In a battery charging apparatus, a charging circuit for supplying charging current to a battery; a relay arranged to complete said charging circuit when closed and to break said charging circuit when open; a thermally responsive impedance constructed to be inserted in the battery to be charged and capable of continuously detecting the internal temperature of the battery as said temperature rises during charging; a balanceable network under influence of said thermally responsive impedance, increase in temperature of said impedance causing said network to be unbalanced in one sense; an adjustable impedance in said network, unbalance of said network caused by changes in temperature of said thermally responsive impedance being recoverable by adjustment of said adjustable impedance; a rotatable shaft for adjusting said adjustable impedance; a reversible motor arranged to turn said shaft in either direction; a first circuit energized only in response to unbalance of said network in said one sense to drive said motor in a direction such as to adjust said adjustable impedance in a direction to rebalance said network; a second circuit energized only in response to unbalance of said network in a sense opposite to said one sense to drive said motor in the opposite direction, said first and second circuits being deenergized whenever said network is substantially balanced; an actuating circuit arranged when completed to energize said relay; a normally open switch in said actuating circuit; a cam carried by said shaft for actuating said switch; a clutch for selectively clutching said cam to and declutching said cam from said shaft, said cam being arranged for rotation by said shaft from an initial position in which said switch is closed to a final position at which said switch is opened, when said clutch is engaged and said shaft rotated in a direction adjusting said adjustable impedance to recover unbalance of said network caused by rising temperature of the battery being charged; means whereby said cam is automatically returned to said initial position whenever said clutch is disengaged, and means whereby said clutch is held disengaged while either said first or said second circuit is energized to cause said network to be balanced with said thermally responsive impedance at the initial internal temperature of the battery being charged.

40. In a battery charging apparatus, the combination of a charging circuit for supplying charging current to a battery; a circuit interrupter arranged to complete said charging circuit when closed and to break said charging circuit when open; a balanceable network; a thermally responsive impedance in said network constructed to be inserted in the battery to be charged, changes in impedance of said thermally responsive impedance resulting from rising temperature of the battery during charging causing said network to be unbalanced in a given sense; means activated by closing of a manual switch for balancing said network when said thermally responsive impedance is at the initial internal temperature of the battery to be charged; rebalancing means constructed to automatically adjust said network periodically during charging of the battery to recover unbalance of said network caused by the effect on said thermally responsive impedance of the rising battery temperature; an actuating circuit arranged to close said circuit interrupter upon closing said manual switch and to maintain said circuit interrupter closed only until completion of a predetermined amount of adjustment of said network by said rebalancing means; indicating means calibrated in terms of battery temperature, and means whereby said indicating means is operated by said rebalancing means.

41. In a battery charging apparatus, a charging circuit for supplying current to a battery; a relay arranged when de-energized to break said charging circuit and when energized to complete said charging circuit; a thermally responsive impedance constructed to be inserted in the battery to be charged and capable of continuously detecting the internal temperature of the battery as said temperature rises during charging; a balanceable network under influence of said thermally responsive impedance, increase in temperature of said impedance causing said network to be unbalanced in one sense; an adjustable impedance in said network, unbalance of said network caused by changes in temperature of said thermally responsive impedance being recoverable by adjustment of said adjustable impedance; a reversible motor arranged to adjust said adjustable impedance in either direction; a first circuit energized only in response to unbalance of said network in said one sense to drive said motor in a direction such as to adjust said adjustable impedance in a direction to rebalance said network; a second circuit energized only in response to unbalance of said network in a sense opposite to said one sense to drive said motor in the opposite direction, said first and second circuits being de-energized whenever said network is substantially balanced; an actuating circuit arranged when completed to energize said relay; a normally open switch in said actuating circuit; switch closing means operable to close said switch only in response to energization of either said first circuit or said second circuit to balance said network when said thermally responsive impedance is at the initial internal temperature of the battery being charged, said switch closing means being constructed to thereafter maintain said switch closed until said motor has rotated a predetermined amount in a direction to recover unbalance of said network caused by effect on said thermally responsive impedance of the increasing internal temperature of the battery during charging; indicating means calibrated in terms of battery temperature, and means whereby said indicating means is operated by said reversible motor.

42. In a battery charging apparatus, a charging circuit; a relay arranged to make and break said charging circuit; a balanceable network including a thermally responsive impedance constructed for insertion in the battery to be charged and capable of being continuously varied by the rising temperature of the battery during charging; an adjustable impedance in said network, whereby unbalance of said network caused by changes in the value of said thermally responsive impedance may be recovered; means for initially adjusting said adjustable impedance to balance said network and for thereafter progressively adjusting said adjustable impedance to recover unbalance of said network caused by effect of the rising temperature of the battery on said thermally responsive impedance during charging, and means for causing said relay to complete said charging circuit upon the initial balancing of said network and causing said relay to break said charging circuit only in response to completion of a predetermined amount of adjustment of said adjustable impedance subsequent to the initial balancing of said network.

43. In a battery charging apparatus, a charging circuit for supplying charging current to a battery; a circuit interrupter in said charging circuit; a balanceable network including a thermally variable impedance constructed to be inserted in the battery to be charged, whereby the balance of said network is varied in response to changes of internal temperature of the battery as detected by said thermally variable impedance; means for maintaining said circuit interrupter closed to complete said charging circuit only in response to unbalance of said network in a sense caused by a relatively low temperature of said thermally responsive impedance and for causing said circuit interrupter to open when said network is substantially balanced; an adjustable impedance in said network by which the balance of said network can be controlled; means for adjusting said adjustable impedance to balance said network with said thermally variable impedance at the initial internal temperature of the battery and for thereafter adjusting said adjustable impedance to unbalance said network to a predetermined extent in a sense to be recovered by a rise in temperature of said thermally responsive impedance, and a fixed impedance in said network limiting the extent to which said network can be unbalanced in said sense by adjustment of said adjustable impedance.

44. In a battery charging apparatus, a charging circuit for supplying charging current to a battery; a relay having contacts in said charging circuit, a Wheatstone bridge having in one arm a thermally variable impedance constructed to be inserted in the battery to be charged; an adjustable impedance in said bridge, whereby the balance of said bridge can be adjusted; means responsive to unbalance of said bridge in a sense caused by a low temperature of said thermally variable impedance for energizing said relay to maintain said contacts closed, completing said charging circuit only while said bridge is unbalanced in said sense; adjustable means for first adjusting said adjustable impedance to balance said bridge when said thermally variable impedance is at the initial internal temperature of the battery being charged and thereafter adjusting said adjustable impedance to unbalance said bridge in said sense to a predetermined extent, and a fixed impedance in said bridge limiting the extent to which said bridge can be unbalanced in said sense.

45. In a battery charging apparatus, a charging circuit for supplying charging current to a battery; a circuit interrupter arranged to make and break said charging circuit; a Wheatstone bridge including in one arm a thermally responsive impedance having a negative temperature coefficient and constructed to be inserted in the battery to be charged; means responsive to unbalance of said bridge in a sense caused by a high impedance value of said thermally responsive impedance to cause said circuit interrupter to complete said charging circuit only while said bridge is unbalanced in said sense; an adjustable impedance in said bridge, whereby the balance of said bridge can be changed; adjusting means for first adjusting said adjustable impedance to balance said bridge when said thermally responsive impedance is at the initial internal temperature of the battery being charged and thereafter unbalancing said bridge to a predetermined extent in a sense to be recovered by a decrease in impedance of said thermally responsive impedance, and a fixed impedance in the arm of said bridge balancing said one arm, the value of said fixed impedance being such that said bridge cannot be unbalanced, in a sense to be recovered by a decrease in impedance of said thermally responsive impedance, beyond a predetermined extent regardless of the adjustment of said adjustable impedance.

46. In a battery charging apparatus, a charging circuit for supplying current to a battery; a balanceable network, said network including a thermally responsive impedance adapted to be subjected to the internal temperature of the battery to be charged; a circuit interrupter having contacts in said charging circuit; means responsive to unbalance of said network in one sense for causing said contacts to be closed until said network is rebalanced; manually operated adjusting means for balancing said network when said thermally variable impedance is at the initial internal temperature of the battery to be charged, and separate manually operated adjusting means for unbalancing said network in said one sense, said last mentioned manually operated adjusting means being calibrated in terms of per cent of charge.

JAMES B. GODSHALK.
LEWIS A. MEDLAR.

REFERENCES CITED

The following references are of record in the file of this patent:

UNITED STATES PATENTS

| Number | Name | Date |
|---|---|---|
| 1,457,863 | Strawmyer et al. | June 5, 1923 |
| 1,602,559 | Strawmyer | Oct. 12, 1926 |
| 2,022,874 | West | Dec. 3, 1935 |
| 2,102,141 | Wagar | Dec. 14, 1937 |
| 2,296,924 | Heyer et al. | Sept. 29, 1942 |
| 2,347,452 | Amsden | Apr. 25, 1944 |
| 2,354,877 | Peters | Aug. 1, 1944 |
| 2,355,488 | Van Vulpen et al. | Aug. 8, 1944 |
| 2,369,826 | Heyer et al. | Feb. 20, 1945 |
| 2,402,695 | Taylor et al. | June 25, 1946 |
| 2,413,865 | Dalzell | Jan. 7, 1947 |
| 2,421,523 | Rady | June 3, 1947 |
| 2,432,069 | Pugh | Dec. 2, 1947 |
| 2,498,814 | Little et al. | Feb. 28, 1950 |
| 2,499,663 | Medlar | Mar. 7, 1950 |